US005903455A

United States Patent [19]

Sharpe, Jr. et al.

[11] Patent Number: 5,903,455

[45] Date of Patent: May 11, 1999

[54] INTERFACE CONTROLS FOR USE IN A FIELD DEVICE MANAGEMENT SYSTEM

[75] Inventors: Richard R. Sharpe, Jr., Lakeville; Robert Bruck, Apple Valley; Richard Wagenknecht, Cottage Grove; Jon D. Westbrock, Richfield; Craig R. Tielens, Minneapolis; James W. Kieley, Plymouth, all of Minn.

[73] Assignee: Fisher-Rosemount Systems, Inc., Austin, Tex.

[21] Appl. No.: 08/764,057

[22] Filed: Dec. 12, 1996

Related U.S. Application Data

[63] Continuation of application No. 08/599,371, Feb. 6, 1996.

[51] Int. Cl.[6] .......... G05B 9/02

[52] U.S. Cl. .......... 364/188; 364/146

[58] Field of Search .......... 364/140–148, 364/160, 172, 180, 188–193, 131–139

[56] References Cited

U.S. PATENT DOCUMENTS

| | | | |
|---|---|---|---|
| Re. 33,162 | 2/1990 | Yoshida et al. | 364/492 |
| 3,665,172 | 5/1972 | Speargaren | 235/150.1 |
| 4,006,464 | 2/1977 | Landell | 340/172.5 |
| 4,047,003 | 9/1977 | LaRocca et al. | 235/151.11 |
| 4,096,566 | 6/1978 | Borie et al. | 364/200 |
| 4,195,344 | 3/1980 | Yamazaki | 364/200 |
| 4,368,510 | 1/1983 | Anderson | 364/151 |
| 4,413,314 | 11/1983 | Slater et al. | 364/188 |
| 4,443,861 | 4/1984 | Slater | 364/900 |
| 4,517,637 | 5/1985 | Cassell | 364/138 |
| 4,571,676 | 2/1986 | Mantellina et al. | 364/200 |

(List continued on next page.)

FOREIGN PATENT DOCUMENTS

| | | |
|---|---|---|
| 0 434 288 A2 | 6/1991 | European Pat. Off. . |
| 0 434 986 A2 | 7/1991 | European Pat. Off. . |
| 0 560 226 A2 | 9/1993 | European Pat. Off. . |
| 2 692 701 | 12/1993 | France . |
| 2 713 360 | 6/1995 | France . |
| 42 10 376 A1 | 10/1992 | Germany . |
| WO 95/04314 | 2/1995 | WIPO . |
| WO 95/09387 | 4/1995 | WIPO . |
| WO 95/26527 | 5/1995 | WIPO . |
| WO 96/07957 A1 | 3/1996 | WIPO . |

OTHER PUBLICATIONS

Fisher, "Fieldvue Instruments: Opening A Window To The Process," *Fisher Controls International, Inc.*, pp. 1–8 (1994).

Fisher, "Fieldvue Digital Valve Controller DVC5000 Series," *Fisher Controls International, Inc.*, Bulletin 62.1:DVC5000, pp. 1–12 (Jun. 1994).

Fisher, "Fieldvue Digital Valve Controller DVC5000 Series Remotely Accessible Information," *Fisher Controls International, Inc.*, Bulletin 62.1:DVC5000(S1), pp. 1–2 (Jun. 1994).

(List continued on next page.)

*Primary Examiner*—Reba I. Elmore
*Assistant Examiner*—Thomas E Brown
*Attorney, Agent, or Firm*—Marshall, O'Toole, Gerstein, Murray & Borun

[57] ABSTRACT

An interface control for use in a field device management system coupled to a set of smart field devices automatically performs functions related to communication between a device, a database and a user of the management system and functions related to interfacing with a user in a manner which is transparent to the software application running on the management system. The control monitors a device, or a block or a parameter of a device, displays information pertaining to the device, block or parameter to a user, receives information pertaining to such device, block, or parameter from a user and the device, automatically updates the displayed information, and implements changes to the device block or parameter specified by the user. A timeline control specifies a time at which past, present or future configurations of devices, blocks, parameters, or other data associated with one or more devices is to be displayed.

46 Claims, 18 Drawing Sheets

U.S. PATENT DOCUMENTS

| | | | |
|---|---|---|---|
| 4,586,151 | 4/1986 | Buote | 364/513 |
| 4,589,063 | 5/1986 | Shah et al. | 364/200 |
| 4,602,343 | 7/1986 | Dougherty | 364/505 |
| 4,628,437 | 12/1986 | Poschmann et al. | 364/131 |
| 4,639,852 | 1/1987 | Motomiya | 364/138 |
| 4,641,269 | 2/1987 | Japenga et al. | 364/473 |
| 4,648,064 | 3/1987 | Morley | 364/900 |
| 4,663,704 | 5/1987 | Jones et al. | 364/188 |
| 4,672,529 | 6/1987 | Kupersmit | 364/130 |
| 4,680,753 | 7/1987 | Fulton et al. | 370/85 |
| 4,682,158 | 7/1987 | Ito et al. | 340/679 |
| 4,704,676 | 11/1987 | Flanagen et al. | 364/146 |
| 4,774,656 | 9/1988 | Quatse et al. | 364/900 |
| 4,777,584 | 10/1988 | Pogue | 364/146 |
| 4,825,404 | 4/1989 | Theus | 364/900 |
| 4,864,489 | 9/1989 | Yasuhara et al. | 364/131 |
| 4,910,658 | 3/1990 | Dudash et al. | 364/138 |
| 4,910,691 | 3/1990 | Skeirik | 364/513 |
| 4,965,742 | 10/1990 | Skeirik | 364/513 |
| 4,965,880 | 10/1990 | Petitjean | 364/468 |
| 5,068,778 | 11/1991 | Kosem et al. | 364/138 |
| 5,095,417 | 3/1992 | Hagiwara et al. | 364/138 |
| 5,115,511 | 5/1992 | Nilsson et al. | 395/800 |
| 5,121,318 | 6/1992 | Lipner et al. | 364/146 |
| 5,122,948 | 6/1992 | Zapolin | 364/131 |
| 5,124,908 | 6/1992 | Broadbent | 364/188 |
| 5,140,677 | 8/1992 | Fleming et al. | 395/159 |
| 5,146,401 | 9/1992 | Bansal et al. | 364/138 |
| 5,164,894 | 11/1992 | Cunningham-Reid et al. | 364/131 |
| 5,168,441 | 12/1992 | Onarheim et al. | 364/146 |
| 5,202,961 | 4/1993 | Mills et al. | 395/159 |
| 5,208,744 | 5/1993 | Kanda | 364/162 |
| 5,233,510 | 8/1993 | Brueckner et al. | 364/131 |
| 5,247,450 | 9/1993 | Clark | 364/473 |
| 5,251,125 | 10/1993 | Karnowski et al. | 364/189 |
| 5,265,005 | 11/1993 | Schmidt et al. | 364/147 |
| 5,282,128 | 1/1994 | Braude | 364/168 |
| 5,289,365 | 2/1994 | Caldwell et al. | 364/138 |
| 5,307,491 | 4/1994 | Feriozi et al. | 395/681 |
| 5,309,556 | 5/1994 | Sismilich | 395/161 |
| 5,311,451 | 5/1994 | Barrett | 364/550 |
| 5,317,723 | 5/1994 | Heap et al. | 395/500 |
| 5,319,751 | 6/1994 | Garney | 395/442 |
| 5,323,328 | 6/1994 | Tanaka | 364/492 |
| 5,365,423 | 11/1994 | Chand | 364/140 |
| 5,371,895 | 12/1994 | Bristol | 395/800 |
| 5,377,315 | 12/1994 | Leggett | 395/140 |
| 5,384,910 | 1/1995 | Torres | 395/156 |
| 5,392,389 | 2/1995 | Fleming | 395/159 |
| 5,394,522 | 2/1995 | Sanchez-Frank et al. | 395/159 |
| 5,406,176 | 4/1995 | Sugden | 315/292 |
| 5,408,603 | 4/1995 | Van de Lavoir et al. | 395/161 |
| 5,412,643 | 5/1995 | Kogure | 370/24 |
| 5,420,977 | 5/1995 | Sztipanovits et al. | 395/160 |
| 5,426,732 | 6/1995 | Boies et al. | 395/161 |
| 5,428,734 | 6/1995 | Haynes et al. | 395/159 |
| 5,437,007 | 7/1995 | Bailey et al. | 395/159 |
| 5,444,642 | 8/1995 | Montgomery et al. | 364/550 |
| 5,452,201 | 9/1995 | Pieronek et al. | 364/188 |
| 5,459,825 | 10/1995 | Anderson et al. | 395/133 |
| 5,459,867 | 10/1995 | Adams et al. | 395/651 |
| 5,461,710 | 10/1995 | Bloomfield et al. | 395/161 |
| 5,465,364 | 11/1995 | Lathrop et al. | 395/681 |
| 5,485,400 | 1/1996 | Warrior et al. | 364/550 |
| 5,486,998 | 1/1996 | Corso | 364/152 |
| 5,497,316 | 3/1996 | Sierk et al. | 364/140 |
| 5,500,934 | 3/1996 | Austin et al. | 395/755 |
| 5,586,324 | 12/1996 | Sato et al. | 395/652 |
| 5,613,123 | 3/1997 | Tsang et al. | 395/651 |

OTHER PUBLICATIONS

Fisher, "Fieldvue Digital Transducer DT4000 Remotely Accessible Information," *Fisher Controls International, Inc.*, Bulletin 62.1:DT4000(S1), pp. 1–2 (Jun. 1994).

Fisher, "Type VL1000 Fieldvue Valve Link," *Fisher Controls International, Inc.*, Bulletin 62.1:VL1000, pp. 1–2 (Jun. 1994).

Fisher, "Fieldvue Digital Transducer Type DT4000," *Fisher Controls International, Inc.*, Bulletin 62.1:DT4000, pp. 1–12 (Jun. 1994).

Fisher, "Type HF100 Fieldvue Hart Filter," *Fisher Controls International*, Form 5340, pp. 1–6 (Dec. 1993).

Fisher, "Hart Communicator Manual for Fieldvue Instruments," *Fisher–Rosemount*, Form 5345, pp. 1–40 (Apr. 1995).

Fisher, "Fieldvue Digital Valve Controller Type DVC5000 Series," *Fisher–Rosemount*, Form 5335, pp. 1–38 (Jun. 1995).

Fisher, "Fieldvue Digital Transducer Type DT4000," *Fisher–Rosemount*, Form 5334, pp. 1–24 (Jun. 1995).

Fisher, "Fieldvue ValveLink Series VL2000 Software," Bulletin 62.1:VL2000, *Fisher Controls International, Inc.*, pp. 1–6 (Nov., 1995).

Fisher, "PC–Based Communications Program," ProLink Software, Product Data Sheet PS–00033, *Micro Motion, Inc.*, 2 pages (Nov., 1995).

Fisher, "Cornerstone Base Station," Model 2500H1, Product Data Sheet PDS 4693, *Fisher–Rosemount Systems, Inc.*, pp. 1–8 (Sep., 1995).

ISP, "InterOperable Systems Project (ISP) Device Description Services (DDS) User's Guide," ISP–94–110, Rev. 1.0, 54 pages (Jun. 1994).

ISP, "InterOperable Systems Project Fieldbus Specification Device Description Language," *ISP Foundation*, pp. 1–101 (Dec. 1993).

Leeney, "Instrument Remotely Verifies Valve's Stem Position," *Chemical Processing*, Form 8238, pp. 1–2 (Dec. 1993).

Office Action dated Mar. 26, 1998 issued in U.S. Application No. 08/599,371.

PCT International Preliminary Examination Report, mailed Mar. 31, 1998 in PCT Aplication No. PCT/US97/01534.

PCT International Search Report mailed Jun. 20, 1997, 4 pgs.

PCT International Search Report mailed Jun. 30, 1997, 4 pgs.

Arnold, et al., "Object–Oriented Design Environments in Process Control," 8131 Advance in Instrumentation and Control 44(1989), Part 3.

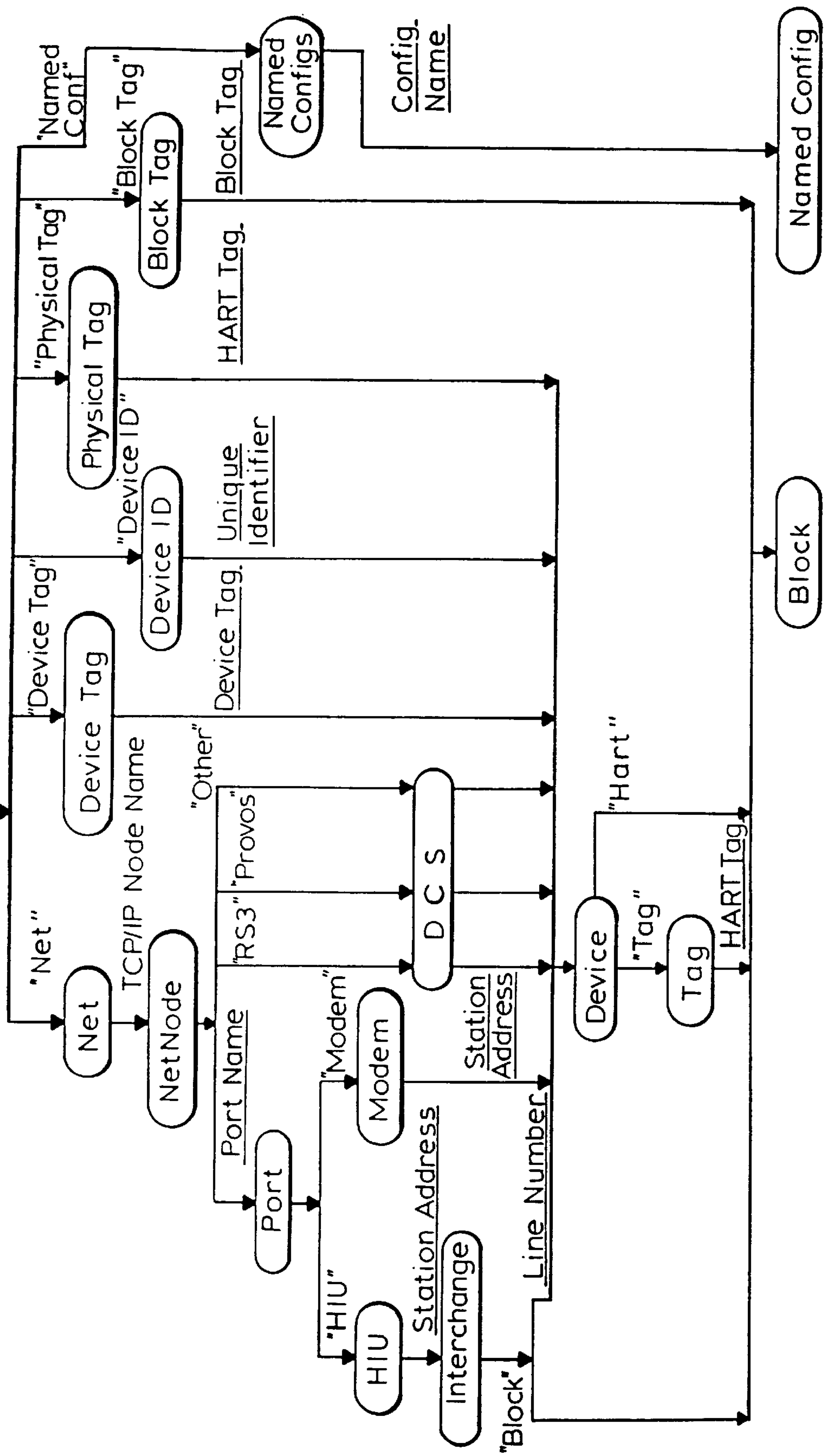
FIG. 3
Root
Root
"Net"
Net
TCP/IP Node Name
NetNode
Port Name
Port
"HIU"
HIU
Station Address
Interchange
"Block"
Line Number
"Modem"
Modem
Station Address
"RS3"
"Provos"
"Other"
D C S
Device
"Tag"
Tag
HART Tag
"Hart"
"Device Tag"
Device Tag
Device Tag
"Device ID"
Device ID
Unique Identifier
"Physical Tag"
Physical Tag
HART Tag
"Block Tag"
Block Tag
Block Tag
"Named Conf"
Named Configs
Config Name
Named Config
Block

INTERFACE CONTROLS FOR USE IN A FIELD DEVICE MANAGEMENT SYSTEM

RELATED APPLICATION

This application is a continuation of U.S. patent application Ser. No. 08/599,371, entitled "System and Method for Managing a Transaction Database of Records of Changes to Field Device Configurations," filed Feb. 6, 1996.

TECHNICAL FIELD

The present invention relates generally to management systems having applications that manage "smart" field devices within a process or a plant and, more particularly, to automatic controls used by such management systems which control functions related to interfacing between an application, a user, a database, and smart field devices within a process.

BACKGROUND ART

Typically, process plants (such as chemical refinery plants and drug manufacturing plants, for example) include many field devices which control and measure parameters within the process. Each field device may be a control device (such as a flow valve controller), a measurement device (such as a temperature gauge, pressure gauge, flow meter, etc.) and/or any other device that affects or determines a value associated with a process. Until the past decade or so, field devices have typically been rather simple devices which were controlled either manually or electronically and which produce output readings either electronically or on a gauge connected to the device. However, these devices typically only provide limited information to a controller such as analog signals pertaining to the readings or measurements made by these devices.

More recently, so called "smart" field devices have been developed. Smart field devices are capable of communicating with a process controller and/or a management system associated with the device. Typical smart field devices are capable of transmitting an analog signal indicative of the value associated with the device, for example, a measurement value, and of storing and also digitally transmitting detailed device--specific information, including calibration, configuration, diagnostic, maintenance and/or process information. Some smart devices may, for example, store and transmit the units in which the device is measuring, the maximum ranges of the device, whether the device is operating correctly, troubleshooting information about the device, how and when to calibrate the device, etc. Furthermore, a smart field device may be able to perform operations on itself, such as self-tests and self-calibration routines. Exemplary smart devices include devices which follow the HART (Highway Addressable Remote Transducer) protocol (HART devices), the Fieldbus protocol (Fieldbus devices), the Modbus protocol, and the DE protocol. However, other smart device protocols may exist or be developed in the future to support different types of smart devices.

Currently, every conventional and smart device is capable of performing one or more specific input and/or output functions with respect to a process. An input function is any function which measures or reads a value associated with a process, such as the function performed by a temperature or pressure measurement device. An output function is any function that changes something within a process, such as the functions performed by a valve or flow controller.

Furthermore, some smart devices, such as Fieldbus devices, can perform control functions which are functions associated with the control of a process. Each input, output and control sub-function performed by a device is referred to as a "block." By definition, therefore, each device includes at least one and maybe more blocks. Fieldbus devices usually include multiple blocks (e.g., one or more input, output, and control blocks), and, while HART devices do not include blocks per se, the contents of a HART device may be conceptualized as constituting one and only one block.

Each block and, therefore, each device includes one or more "parameters." A parameter is an attribute of a block which characterizes, affects or is somehow otherwise related to the block. Parameters may include, for example, the type of the block, the maximum operating or measurement range of a block, the mode of a block, the value of a block measurement, etc.

Likewise, each parameter has one or more properties associated therewith, and each of those properties defines or describes the information within the parameter. For example, the temperature parameter of a temperature measuring device has a label property which stores the name of the parameter (e.g., "temperature"), a value property which stores the value of the parameter (e.g., the actual measured temperature), and a units property which stores the units in which the temperature PATENT 06005/33102 value is expressed (e.g., degrees centigrade or degrees fahrenheit). A device or a block configuration comprises a set of values for each of the properties of each of the parameters associated with a device or a block.

As noted above, smart field devices are developed so that communication therewith must be performed in one of several available protocols (the HART and Fieldbus protocols, for example). These protocols allow device manufacturers to provide device-specific types of information for a device and, of course, the particular types of information are different for each type of smart field device. Consequently, these protocols are complex and difficult to use in device programming. More particularly, some of these protocols do not provide a completely consistent method for communicating with every smart device conforming thereto. Instead, these protocols, such as the HART protocol, merely provide a way for device manufactures to specify what information is available from each smart field device and how to retrieve that information.

Communication with smart devices has been simplified to some extent with the advent of device description languages (DDL) and device descriptions which are provided by the manufacturers of smart field devices. A DDL is a human-readable language that provides a protocol for describing the data available from a smart device, the meaning of the data associated with the smart device and retrieved therefrom, the methods available for implementation of the smart device, the format for communicating with the smart device to obtain data, user interface information about the device such as edit displays and menus, and information for handling or interpreting other information pertaining to a smart device.

DDL source files comprise human-readable text written by device developers. These files specify all the information available about a device between the device arid a bus or a host to which the device is connected. Basically, in developing a DDL source file for a device, a developer uses the DDL language to describe core or essential parameter characteristics of the device as well as to provide group-specific, and vendor-specific definitions relating to each block, parameter, and special feature of a smart device.

A DDL source file is compiled into a binary format to produce a machine-readable file known as a device description (DD) which can be provided to a user by the device manufacturer or a third-party developer to be stored in a host system, such as a management system. In some cases, for example in Fieldbus devices, DDL source files may be stored in a smart device and transferred from the smart device to a host system. When the host system receives a DD object file for a smart device, it can decode and interpret the DD to derive a complete description of the interface with the device.

DDS is a general software system developed and provided by Fisher-Rosemount Systems, Inc. and/or Rosemount, Inc. for automatically decoding and interpreting the DD's of smart devices. More particularly, DDS is a library of routines which, when called by a host, interprets the DD of a smart device to provide the host with information pertaining to the smart device, including information pertaining to: (1) the setup and configuration of the smart device; (2) communication with the smart device; (3) user interfaces; and (4) methods available for use in conjunction with the smart device. One extremely useful application of DDS is in providing a consistent interface between a host system and one or more smart devices having associated DDL source files (and corresponding DD object files).

Although DDS, DDL and DD's are generally known in the art, more information pertaining to the specific function and format of DDL's, and of Fieldbus DDL in particular, can be found in the InterOperable Systems Project Foundation's manual entitled "InterOperable Systems Project Fieldbus Specification Device Description Language" (1993). A similar document pertaining to the HART DDL is provided by the HART foundation.

A management system is a system which interacts with one or more smart field devices to read any of the device, block, parameter, variable, or configuration information associated with those devices. Typically, a management system comprises a personal computer having appropriate communication ports which allow it to interconnect to, communicate with, and reconfigure a smart device. Management systems may be on-line, that is, have a hard-wired or other permanent connection with a smart device, or may be portable and capable of being periodically connected to a smart device to reconfigure that smart device.

Management systems typically perform a wide variety of functions with respect to smart devices within a system. For example, management systems may be used to provide users with information (e.g., values of variables or parameters) pertaining to the state of a process and to each of the smart field devices associated with or connected to the process. Management systems may also be used to enable a user to monitor a process and control the process by reconfiguring smart devices within the process as necessary.

The software routines which are used to perform functions within a management system using features provided by the system are typically referred to as applications. Typically, management systems implement applications provided by individual smart device manufacturers to implement changes on, and read data from, a particular smart device. As a result, various applications within a management system often do not share a common or consistent interface, and the transition from one application to another is therefore cumbersome and time-consuming. Further, smart device configuration data, configuration logs, and smart device diagnostic data created and stored by different applications are decentralized and cannot be cross-referenced because this data may be stored in diverse formats, in different databases and, in some cases, in proprietary formats. Consequently, tasks that could be common to each device within a system must be duplicated in separate applications.

A management system which implements such separately developed applications typically has no way to view information pertaining to all the smart devices in a plant or a process simultaneously because the applications for each device must be run separately. Furthermore, it is difficult for users to write applications that provide a comprehensive view of data pertaining to multiple, different devices in a process because users typically do not have a great familiarity with DDS or with the DDL and DD's associated with each of the devices within a process. Even if a user does have such familiarity, such applications are time-consuming and expensive to develop and must be updated each time a new smart device is added to the system.

Another cumbersome aspect of developing applications for management systems is programming the application to perform the numerous tasks relating to and necessary for communication between a user and each smart device within a system. A developer not only must be attentive to details involving how to communicate with each separate device, but that developer must also pay particular attention to how information is presented to a user via, for example, a display. This task is made more difficult because typical applications do not use consistent user interface protocols. Instead each of the interface functions requires much programming time and effort, which must be repeated each time a new smart device is added to the system.

Still further, applications typically allow a user to view a current configuration of a device, block, or parameter within a process, but those applications do not allow the user to view past configurations or to display multiple configurations simultaneously to compare such configurations.

SUMMARY OF THE INVENTION

This invention is related to interface controls for use in a management system capable of being coupled to one or more smart field devices. The interface controls perform consistent communication and interfacing functions between an application, a user interface and multiple field devices coupled to the system so that no new programming is necessary to communicate with and display information pertaining to newly added smart devices. The interface controls may use a communication network which relies on a hierarchy of information related to one or more DDL's associated with one or more smart devices connected to the system. The communication network uses this hierarchy to call, access information from, and communicate with a DDS associated with the one or more categorized DD's, smart devices connected within a system, and/or a database associated with the system.

Controls according to the present invention use the communication network to perform functions related to communication between a device or a database and a user in a manner which is transparent to applications running on the management system. Preferably, such controls monitor a device, block, or parameter; display information pertaining to the device, block or parameter to a user; receive information pertaining to such device, block, or parameter from a user; automatically update the display in response to changes to the device, block or parameter; and/or implement changes specified by the user or the application, all in a continuous or semi-continuous manner.

Preferably, a control is also provided to display historical information pertaining to a device, block, parameter, or any other construct associated with one or more devices in a system. Particularly, a timeline control can be used to specify past, present and future times for which configurations of devices, blocks, parameters, or other data associated with devices can be displayed. Timeline controls may also be used to display multiple configurations simultaneously.

Using such controls, an application for a management system can be designed even by an application designer who has no knowledge of the steps necessary to perform these communication tasks, the particular kinds of devices that are available to, or are attached to the system, or the different protocols associated with each of the smart devices connected to the system.

BRIEF DESCRIPTION OF THE DRAWINGS

FIG. 3 is an upper hierarchy of object information used by a device communication network according to the present invention;

DETAILED DESCRIPTION

Figure 1:
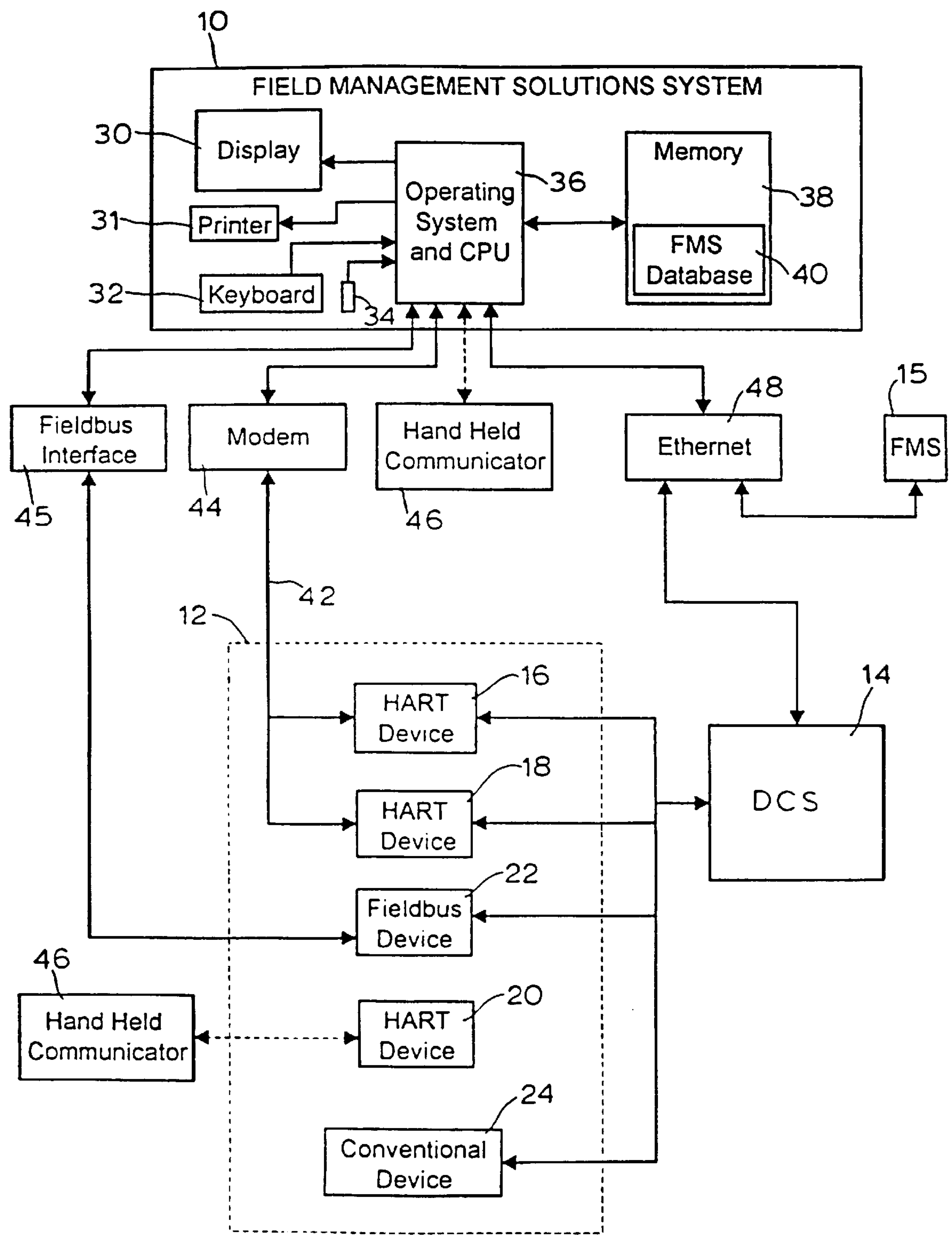
FIG. 1 is a block diagram illustrating the interconnections between a process, a distributed control system and a management system.

FIG. 1 illustrates a management system 10, referred to hereinafter as a Field Management Solutions system (an FMS system), interconnected with a process 12, a distributed control system (DCS) 14 which controls the process 12, and a further management system such as another FMS system 15. The process 12 may comprise any desired type of process, such as a manufacturing or refinery, process, etc., and is illustrated as including four smart field devices, including three HART devices 16, 18 and 20 and one Fieldbus device 22, and a conventional (i.e., non-smart) device 24. The devices 16, 18, 20, 22 and 24 are controlled in any desired manner by the DCS 14

Generally, the FMS system 10 is a PC-based software tool that includes applications which perform field-device management tasks. The FMS system 10 integrates device management for each of the devices within the process 12 by helping users to, for example, configure, calibrate, monitor and troubleshoot any and all of the smart field devices associated with the process 12.

The FMS system 10, which may comprise any type of computer- or microprocessor-based system, may include a display 30, a printer 31, a keyboard 32 and a mouse 34 connected to an operating system and CPU 36. A memory 38 having an FMS database 40 is coupled to the operating system and CPU 36. The memory 38, including the FMS database 40, stores software and data used by the FMS system 10 in performing tasks related to displaying information to a user via the display 30 or the printer 31 and communicating with the smart devices 16, 18, 20 and 22. In addition, the FMS database 40 stores device-related information which is not available from the smart devices, for example, information pertaining to past configurations of the devices, information pertaining to off-line devices, such as off-line smart devices and conventional devices, and information pertaining to service notes including when the next service is needed; who performed service procedures; any favored replacement devices, etc. Data pertaining to off-line smart devices may be stored within the database 40 in a format identical to the format in which that data is actually stored within the off-line devices so that, to the FMS system 10, off-line devices appear to be available through the database 40 in the same way they would be available if those devices were online.

The smart devices 16 and 18 are on-line devices which are connected to the FMS system via a communication line 42 and a modem 44. The smart device 22 is an on-line device which is connected to the FMS system via a Fieldbus interface 45. The smart device 20 is an off-line device which is not permanently connected to the FMS system 10. However, the smart device 20 may communicate with the FMS system 10 via a hand--held communicator and/or secondary (laptop) FMS 46 which may be periodically connected to the device 20 and/or any of the other smart devices to read data from, and write data to, the device 20 and/or the other smart devices. Thereafter, the hand-held communicator and/or secondary FMS 46 may be connected to the FMS system 10 to upload data pertaining to the smart device 20 and/or any other smart devices to which it was attached and store such data in the FMS database 40.

If desired, the operating system and CPU 36 of the FMS system can be connected through, for example, an ethernet communication link 48 and/or other network link to the DCS 14 and other FMS systems, for example, the other FMS system 15.

Figure 2:
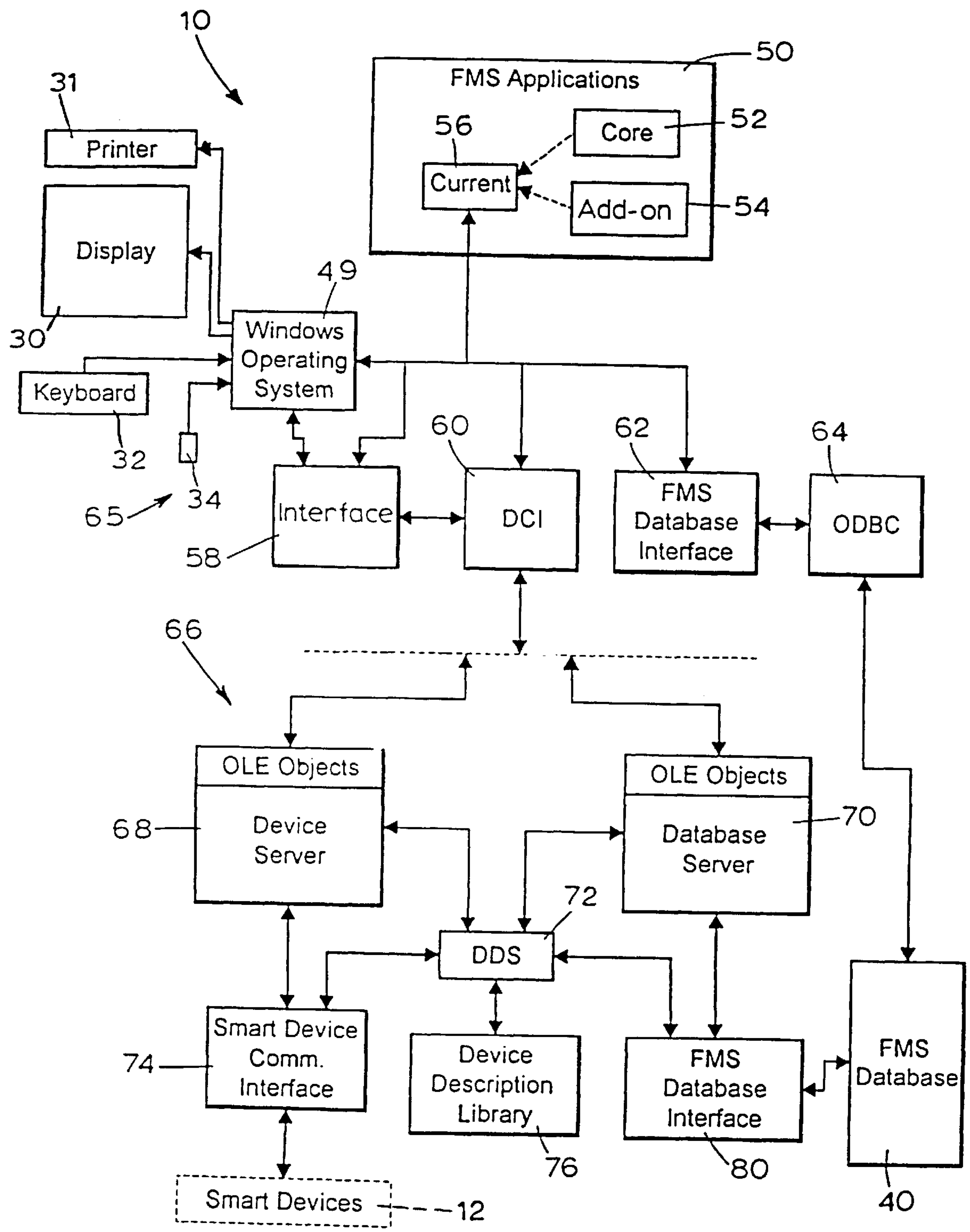
FIG. 2 is a block diagram of the management system of FIG. 1 having user interface controls which operate according to the present invention.

FIG. 2 illustrates the interconnections between various component parts of the FMS system 10, including hardware and software components, and will be used to describe how the various software components stored in the memory 38 of the FMS system 10 interact with each other, with the display 30, the printer 31, the keyboard 32, the mouse 34, the FMS database 40 and the smart devices within the process 12. It is understood that the software components of the FMS system 10 are stored in the memory 38 and are run on the operating system and CPU 36.

The FMS system 10 preferably operates in a Microsoft Windows environment (such as a Windows 95™ environment) and, therefore, includes a standard Windows operating system 49, which is used to display data and information on the display 30 and the printer 31 and to retrieve data and information from the keyboard 32 and the mouse 34. Thus, information provided to, or retrieved from, the Windows operating system 49 is preferably provided in a standard Windows call format of any desired type, as is known to those skilled in the art. However, the FMS system 10 could be implemented according to the present invention using any other desired Windows-based or non-Windows-based interface format (whether or not a graphical user interface) including, for example, MacIntosh, Xwindows or IBM DOS formats.

The FMS system 10 includes a set of FMS applications 50 comprising core applications 52 and add-on applications 54. The core applications 52 are essentially programs written by the FMS system provider to perform predetermined and frequently used operations. The add-on applications are applications which are developed by a user or a third-party developer and imported to the FMS system 10 to perform customized functions.

As used hereinafter, an application refers to any software routine implemented by the FMS system 10 which displays to a user information pertaining to or about the process 12 or one or more devices, blocks, parameters, or other information associated with the devices connected to, or associated with, the FMS system 10, and/or which allows a user to reconfigure one or more of the devices associated with or connected to the FMS system 10. The information used by an application typically is either stored in, or developed by, the smart devices within the process 12, or is stored in the FMS database 40.

Thus, for example, the FMS system 10 may include core or other applications which allow a user to interact with the data within the FMS database 40 and/or the smart devices within the process 12 to view the present state of one or more of the devices within the process 12, to change the configuration of one or more of the smart devices within the process 12, to view multiple devices in a simultaneous or sequential manner, to perform common smart device control and configuration functions, to run browsers that locate devices on the network, to monitor the status of devices and generate alarm lists, and to implement device calibration and testing routines.

During operation of the FMS system 10, a user selects one or more of the applications for execution. The selected application is identified in FIG. 2 as the current application or applications 56. Because multiple applications may be executed simultaneously by the FMS system 10, there may be multiple current applications 56. Any current application 56 may interface directly with the Windows operating system 49, an interface block 58, a digital control interface (DCI) 60 and an FMS database interface 62. If desired, the current application 56 can also interface with an Open DataBase Connectivity (ODBC) block 64 (a well-known Microsoft database application interface (API) system that enables communication with nearly all databases) and a server network 65. For many applications, however, such connections are not necessary or desirable. Furthermore, any current application 56 may indirectly interface with the Windows operating system 49, the smart devices within the process 12, and the database 40 via the interface block 58.

The interface block 58 is essentially a software package having, for example, specifically configured Windows custom controls, OCX controls or VBX controls, which automatically perform functions relating to the communication of particular, frequently used information between a current application 56, the smart devices within the process 12, the database 40, and a user interface 65 comprising the Windows operating system 49, the display 30, the printer 31, the keyboard 32, and the mouse 34. The interface block 58 can be used by a current application 56 to perform these interfacing functions without the application designer knowing the specifics of the protocols involved therewith. As a result, the interface block 58 enables an application to be designed more easily and provides a consistent user interface.

Preferably, current application(s) 56 and the interface block 58 interface and communicate with the smart devices within the process 12, other FMS systems or distributed control systems and/or the database 40 through the DCI 60 and a server network 66 comprising servers 68 and 70. While typically the server network 66 will be located in, and associated with, the FMS system 10, the dotted line between the DCI 60 and the servers 68 and 70 in FIG. 2 indicates that the DCI 60 can also access server networks of other FMS systems through, for example, the ethernet connection illustrated in FIG. 1.

Essentially, the DCI 60 is a convenience layer comprising a library of routines which perform functions necessary for communicating with, and retrieving data from, and performing other functions pertaining to the database 40, the smart devices associated with the process 12 and/or other FMS systems. In operation, the DCI 60 converts commands and messages sent from the current application 56 and the interface block 58 into a format recognized and used by server network 66 and, likewise, converts data provided by the server network 66 into a form recognized and used by the current application 56 and the interface block 58.

While the DCI 60 can use any desired protocol to perform these communication functions, the DCI 60 preferably uses an object-oriented protocol and, most preferably, uses an object linking and embedding protocol such as the Object Linking and Embedding (OLE) protocol developed and documented by MicroSoft, Inc. The MicroSoft OLE (2.0) protocol is used in the MicroSoft Windows 95™ operating system and is well-known in the art.

Generally, an object-oriented protocol is a programming paradigm which models the world as a collection of self-contained objects that interact by sending messages. Objects include data (a state) and methods (algorithms) that can be performed on the data. In addition, objects are related to one another through an interface connection and may communicate with other objects in the hierarchy through messages. When an object receives a message, it responds by using its own methods which are responsible for processing the data in that object and sending messages to other objects to perform specific tasks and possibly return appropriate results.

Because the DCI 60 communicates with the server network 66 through an OLE hierarchy, the DCI uses standard OLE procedures or calls relating to reading and writing values of OLE objects, enumerating a set of enumerated values in an OLE object, getting and setting properties in OLE objects, calling and implementing methods of OLE objects and retrieving property data stored in the OLE collection objects in conjunction with OLE Item methods (a particular type of OLE method). However, other OLE procedures can be implemented by the DCI 60 on OLE objects to communicate with the server network 66.

As described in more detail below, the particular OLE hierarchy which is preferably used by the FMS system 10 is an OLE object hierarchy which has been developed to categorize all of the different types of information and the interrelationships between the different types of information available for, or used by, each of the different DDL's associated with each of the DD's which, in turn, are associated with the devices within the process 12 being serviced by the FMS system 10. This determined hierarchy defines a set of OLE objects, each of which stores a particular set of properties as defined by the hierarchy and a particular set of methods which can be used to manipulate the property data and to communicate with other OLE objects according to the relationships defined by the hierarchy. This hierarchy will be discussed in more detail in conjunction with FIGS. 3 and 4A–4C.

Essentially, the DCI 60 communicates with the server network 66 as if all the OLE objects identified for the determined hierarchy exist within the memory of the server network 66. The DCI 60 implements a simple set of calls necessary for communicating with the OLE objects in the OLE protocol. In reality, however, the data and methods of each OLE object are not actually stored or placed in the memory of the server network 66 until a call, such as a read or write call, is sent to the server network 66 for such OLE object by, for example, the DCI 60, the DDS 72, the smart device communication network 74, or the FMS database interface 80. At that time, the server network 66 recognizes that the data and methods pertaining to the OLE object must be retrieved and stored in memory associated with one of the servers 68 or 70 and automatically performs the functions necessary to retrieve the data and methods of that OLE object.

When the server network 66 receives a call. relating to the reading or writing of data or methods within one of the OLE objects stored in its memory, the server network 66 returns the requested information or performs the requested function to the OLE object data according to its stored routines so as to read data from, and write data to, the OLE object, the DDS 72, the smart devices within the process 12 and the FMS database 40.

Likewise, the DCI 60 recognizes or receives changes in OLE objects stored within the memory associated with the server network 66 and performs functions based thereon to implement communication with the current application 56 and the interface block 58. The device server 68 is essentially a set of software routines which have a specified correspondence with the set of OLE objects in the determined OLE hierarchy. These routines are specifically developed to communicate with a DDS 72, a smart device communication interface 74, and the OLE objects of the defined hierarchy. Such routines may, for example, transmit, retrieve, and change particular types of data and information stored within, or available from, the smart devices within the process 12 and/or from DD's (which are files) associated with the smart devices within the process 12. Likewise, the database server 70 is essentially a set of software routines associated with the OLE objects in the determined OLE hierarchy. These routines communicate with the DDS or API 72 and/or an FMS database interface 8CI to, for example, transmit, retrieve, or change particular types of data and information stored within, or available from, the FMS database 40 and/or from the DD's which are associated with the smart devices for which data is stored in the FMS database 40. As indicated in FIG. 2, the DD's used by the DDS 72 are stored in a device description library 76 coupled to the DDS library 72.

The routines of the servers 68 and 70 are associated with each of the OLE objects in such a way that the routines which perform the particular read functions required for retrieving the data of an OLE object from the DDS 72, from smart devices, or from the database 40 are automatically implemented by a request for such data from the DCI 60. Likewise, the routines of the servers 68 and 70 are associated with each of the OLE objects in such a way that the routines which perform the particular writing functions required for changing the configuration of smart devices or storing information in the database 40 are automatically implemented by a request made by the DCI 60 to write such data in the OLE object.

These server routines are simple, straightforward, and easy to write by those skilled in the art and are not, therefore, provided herein. However, those familiar with OLE and DDL's can create such routines in a straightforward manner using any desired programming language.

Generally, to retrieve specific data from, or pertaining to, one of the on-line devices of the process 12, the server 68 asks the DDS 72 for the specific data. If that data is stored in the DD for a smart device, the DDS 72 then consults the DD for the referenced device or the DD associated with a block of the referenced device and returns the requested data to the server 68.

If the specific data was available from the DD, the server 68 stores and maintains that data in the OLE object to which the retrieved data is related. If however, the requested specific data is not available from the DD for a device or a block of a device but is stored, instead, in the on-line device, the server 68 sends a command to the smart device communication interface 74 (which may comprise any known smart device communication interface including, for example, a Fieldbus device interface developed by SoftIng, a German company located in Karlsruhe, or the HART device interface of Micromotion, located in Boulder, Colo.) to retrieve the specific data from the on-line device.

The smart device communication interface 74 then sends a request to the DDS 72 for information on how to get the specific on-line device for the data requested by the server 68. The DDS 72 retrieves this instruction information from the DD for the on-line device and returns the instruction information to the smart device communication interface 74 which, in turn, sends a proper request to the on-line smart device. The smart device then responds with a data stream including the specific data. The smart device communication interface 74 then sends a request to the DDS 72 for information on how to interpret the data stream received from the on-line smart device. The DDS 72 then retrieves interpretation instructions from the DD for the on-line smart device and returns them to the smart device communication interface 74 which, in turn, interprets the data stream from the on-line device in accordance with the interpretation instructions in order to extract the specific data requested by the server 68. The smart device communication interface then returns the specific data to the server 68 which provides the retrieved data to the OLE object with which that data is associated.

The process of writing data to an on-line device is similar to the process of reading data from that device except that the server 68 first sends a request to the DDS 72 for write information, e.g., whether the data is writable, what type, specific values and range of data can be written, etc. If the data is writable, the server 68 sends a write command to the smart device communication interface 74 which, in turn, interfaces with the DDS 72 for write protocols for the on-line device and sends the proper write command to the on-line device in response to the information. The smart device communication interface 74 can also interpret other data from the on-line devices, such as write verifications, response codes, data or value changes which occur in the device, etc. and sends such data to the server 68 for storage in the proper OLE object.

In some instances, the DDS 72 will inform the server 68 that it needs more information to answer a request for data.

For example, the DDS 72 may determine that the handling property of a parameter (i.e., whether the parameter is readable and/or writable) is dependent on the mode parameter of a particular device. The DDS 72 sends a request to the server 68 for the mode parameter of the device. In response thereto, the server 68 sends a request for the mode parameter of a device to the smart device communication interface 74 which operates as described above to retrieve the mode parameter of the device. When the server 68 receives the mode parameter of the device from the smart device communication interface 74, it sends this information to the DDS 72 which, thereafter, determines the handling property of a parameter of a device and returns such property to the server 68 which, in turn, places that value in the proper OLE parameter object.

Communication between the server 70, the DDS 72 and the FMS database interface 80 is similar to that described above, except that the FMS database interface 80 is programmed to read and write information to and from the FMS database 40 instead of a smart device. Generally, however, the FMS database interface 80 mimics the functions of the smart device communication interface 74 as they relate to communications between the DDS 72 and the server 70.

It is possible to have the FMS database interface 80 store information pertaining to, for example, values associated with off-line devices and data pertaining to changes made to on-line and off-line devices in the database 40 in a DDL format, i.e., in a format that mimics how such data is stored in on-line devices. In such a situation, the FMS database interface 80 may need to access the DDS 72 to determine how the data is stored in the FMS database 40. For example, in some instances, the database 40 stores parameter values, such as past parameter values in order to, for example, mimic the state of a device. Consequently, the FMS database interface 80 may have to access the DDS 72 to retrieve this information to know what type of data is stored in the database, i.e., integer, enumerated, etc. However, information stored in the database 40 need not be stored in a DDL format. Therefore, to service. a command from the server 70 to read data from, or write data to, the database 40, the FMS database interface 80 may not need to access the DDS 72 for device values. Instead, the FMS database interface 80 may write data to, and read data from, the database 40 directly.

The FMS database interface 80 is preferably an application program interface (API) of any conventional type which is specifically set up and configured for retrieving information from the database 40 according to any desired or known method. Thus, the FMS database interface 80 automatically keeps track of where and how data is stored in, and retrieved from the database 40.

As indicated above, the current application 56 and, if desired, the interface block 58 can also interface with the database 40 through the FMS database interface 62 and the ODBC block 64. The FMS database interface 62 may comprise any desired or known applications program interface (API) having a library of routines developed to convert data and requests from a format recognizable or used by the current application 56 into a form recognizable and usable by the ODBC block 64 and vice-versa.

FIGS. 3 and 4A–4C illustrate a particular hierarchy of OLE objects which has been developed to represent all of the information defined within or available from one or more DDL's, a set of smart devices which follow the protocols of those DDL's and a database which stores information related to devices using those DDL's. The hierarchy of FIGS. 3 and 4A–4C also represents the relationships between those OLE objects. This hierarchy can be used within an OLE environment to enable an application to retrieve information associated with a DDL, smart devices which use that DDL, and a database which stores information pertaining to smart devices which use that DDL. Thus, the hierarchy of FIGS. 3 and 4A–4C represents not only an arrangement of DDL information (i.e., information available from DD's of DDL's and/or information available from a device or a database associated with devices using one or more DDL's), but also a way of defining a communication interface between the DCI 60 and the servers 68 and 70 of FIG. 2 in order to access, retrieve, and change this information.

Each of the OLE objects in the hierarchy of FIGS. 3 and 4A–4C is preferably an OLE automation object and is represented as an oval having the type of OLE object identified therein. Each of the OLE objects of FIGS. 3 and 4A–4C includes, or is associated with, a subset of the information defined within or used by one or more DDL's and available from DD's, smart devices and databases which store information pertaining to smart devices.

Generally, each of the OLE automation objects of FIGS. 3 and 4A–4C includes properties (or attributes), methods and interfaces. Because the OLE objects within FIGS. 3 and 4A–4C are automation objects, they have an IDispatch interface (a well-known interface of the OLE protocol) associated therewith. The IDispatch of the OLE automation objects of FIGS. 3 and 4A–4C can be used by, for example, the DCI 60 and the server network 66 to retrieve information pertaining to the properties and the methods of that OLE object and co communicate with other OLE objects.

The properties of an OLE object comprise data pertaining to the objects. Each property also has functions which can be used, for example, to get the property value and to set the property value of the OLE object. Example OLE object properties include the name of the object, a count of the number of items within or associated with the object, a label associated with the object, and help associated with the object.

OLE object methods perform actions on OLE objects, or on the data in OLE objects, implement particular routines using the data in OLE objects, and communicate with other OLE objects. For example, a method may enumerate a set of values in other OLE objects. Together, the properties and the methods of an OLE automation object define the programmable interface of that OLE object accessible by the server network 66 and the DCI 60.

Figure 4A:
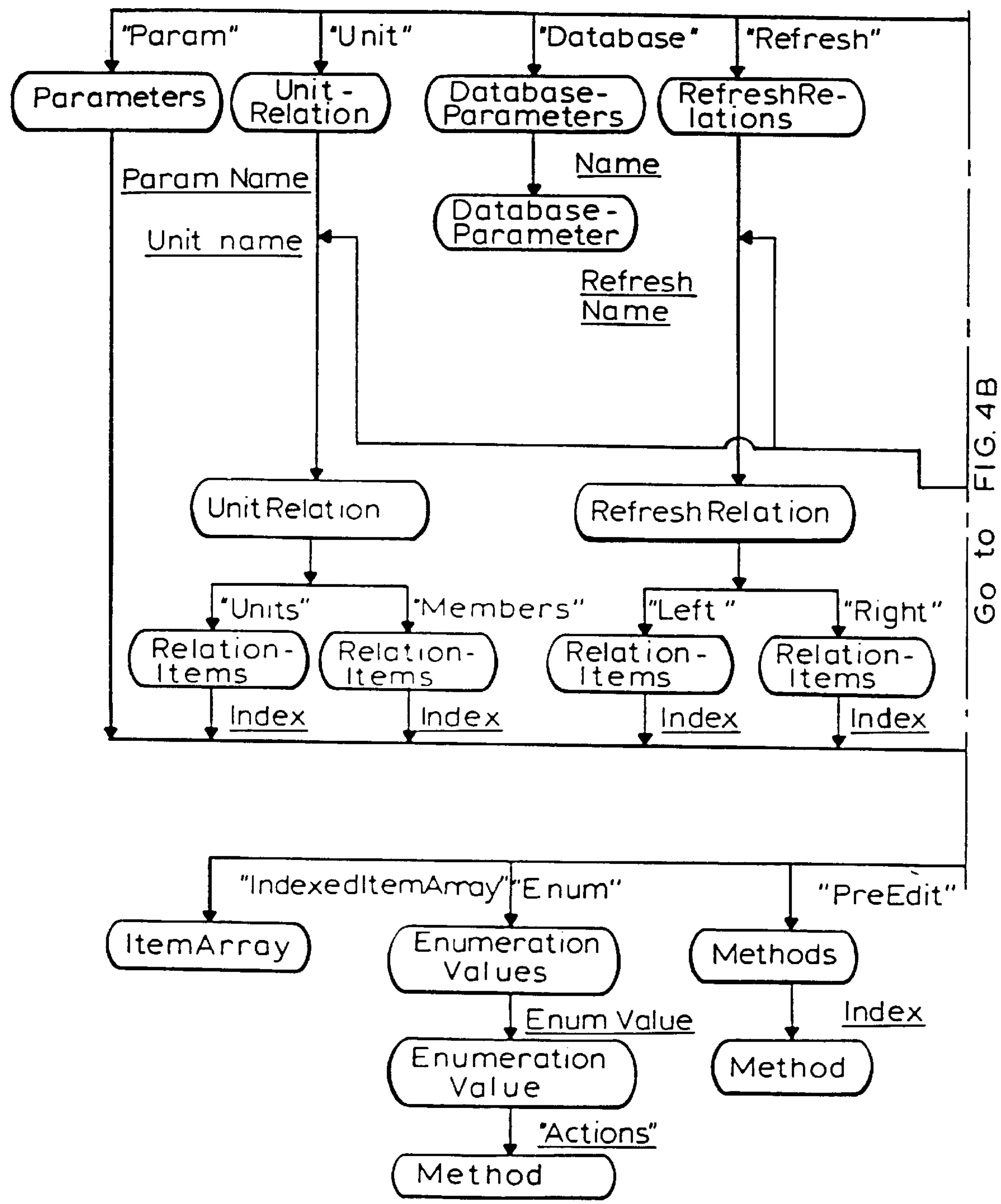
FIGS. 4A–4C are a lower hierarchy of object information used by a device communication network according to the present invention.
Figure 4B:
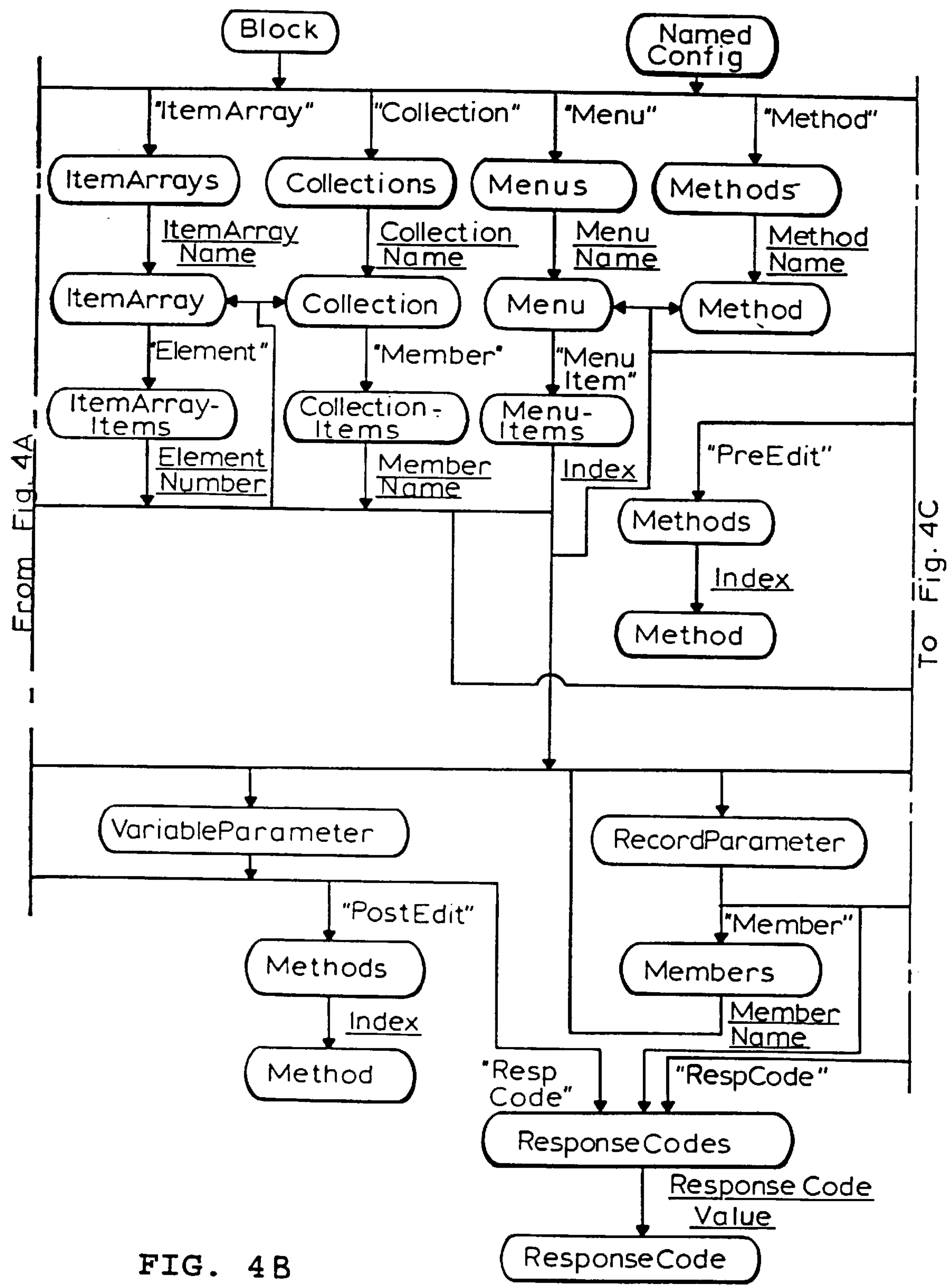
Figure 4C:
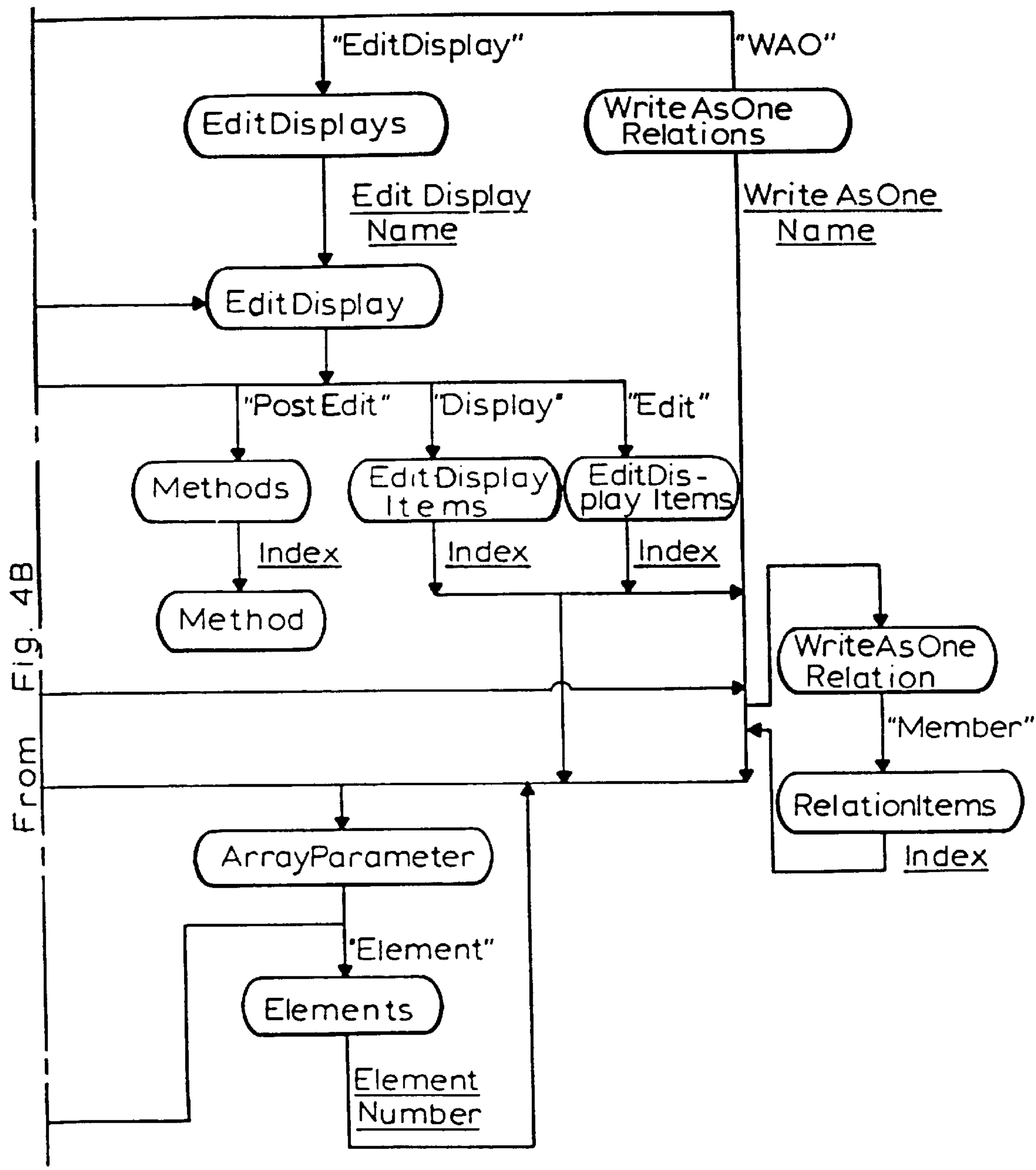

The hierarchy of FIGS. 3 and 4A–4C comprises an upper hierarchy, illustrated in FIG. 3, and a lower hierarchy, illustrated in FIGS. 4A–4C The upper hierarchy of FIG. 3 corresponds to and illustrates the physical or defined connectivity of devices such as HART, Fieldbus, and other smart or conventional devices, and blocks, such as Fieldbus blocks, connected within a process. The lower hierarchy of FIG. 4A–4C illustrates relationships among the data which is available from, or referenced by, DDL's such as the HART and Fieldbus DDL's, and the data which is stored in and/or available from DD's, smart devices and/or a database pertaining to smart or other devices.

The OLE objects of the hierarchy of FIG. 3 and 4A–4C are based on categories of information found in the Fieldbus DDL. The specific relationships between these categories and the Fieldbus protocol is described in detail in U.S. patent application Ser. No. 08/599,371, entitled "System and Method for Managing a Transaction Database of Records of Changes to Field Device Configurations" filed Feb. 6, 1996, which is assigned to the assignee of the present application and which is hereby expressly incorporated by reference herein. It should be recognized, however, that the OLE objects of FIGS. 3 and 4A–4C similarly have functionally equivalent types of data, definitions, and constructs available in other DDL's, such as the HART DDL, and that the hierarchy of FIGS. 3 and 4A–4C therefore can be applied to any DDL.

As noted above, the OLE objects of FIGS. 3 and 4A–4C have been developed to map onto and represent the data available from or defined by the Fieldbus and HART DDL's. Thus, for example, the Block object of FIG. 3 represents and corresponds to the block entity recognized and used by the Fieldbus DDL, while the Device object of FIG. 3 and the Parameter object of FIG. 4A represent and correspond to the device and parameter entities, respectively, recognized and used by both the HART and Fieldbus DDL'S.

Each OLE object within the hierarchy of FIGS. 3 and 4A–4C can be accessed or defined by traversing a path through the hierarchy to that OLE object. Beginning at the top of FIG. 3, every path through the hierarchy of FIGS. 3 and 4A–4C includes a Root object. Root objects define, among other things, the ViewTime to which the data within any of the OLE objects below the Root object pertains. More specifically, the Root object is associated with a ViewTime, which may be "past," "present," or "future" and, in some instances, which specifies a particular time. If the ViewTime is present, the time is the actual time. If the ViewTime is past, the time may be set to any historical time but, preferably, is set to a time at which a change was made to one or more parameter values. Preferably these changes are stored in the database 40 in, for example, an event log. If the ViewTime is future, the time may be set to any future time or may be set to indicate only that it refers generally to the future.

The Item method of the Root object includes a set of collections, as identified in the OLE Object Definitions table, which defines the next layer in the hierarchy of FIG. 3. Generally, the collections of the Item method of an OLE object define interconnections between that OLE object and the OLE objects below that OLE object within the hierarchy of FIGS. 3 and 4A–4C. Each collection of an Item method of an OLE object is illustrated in the hierarchy of FIGS. 3 and 4A–4C by the quoted name of that collection below the OLE object which includes that collection. The generic name of the members within a collection are identified in the hierarchy of FIGS. 3 and 4A–4C by unquoted and underlined expressions located beneath the OLE object associated with the collection type and above the OLE object which has information pertaining to this expression as one of the properties thereof.

Thus, for example, the Root object has a collection of BlockTag objects (identified as the "BlockTag" collection), each of which has a particular name illustrated generally in FIG. 3 as Block Tag. Generally, a block tag is a unique identifier assigned to a particular block within the FMS system by a technician installing/configuring the FMS system in order to identify a particular block. A BlockTag object having a name of BlockTag, therefore, uniquely defines a Block object, as illustrated in FIG. 3. As is evident, the actual number of BlockTag objects within the hierarchy of FIGS. 3 and 4A–4C is dependent on the number of blocks (as that name is used in the Fieldbus DDL protocol) connected to or associated with the FMS system 10.

The PhysicalTag, DeviceID, and DeviceTag objects relate to or are associated with the "PhysicalTag," "DeviceID," and "DeviceTag" collections of the Root object, respectively, and are used to uniquely define a particular device connected to or associated with the FMS system 10. A device ID typically includes a triplet of information comprising the name of the device manufacturer, the model number of the device, and the serial number of the device. Device tags and physical tags usually refer to a location of the device in a plant or a process such as the process 12. The value of a physical tag and/or a device tag can be, for example, an alphanumeric code associated with a specific physical location in the plant or any other description of a physical location. For HART devices, the physical tag is considered the same as the device tag whereas, for Fieldbus devices, the physical tag can have a different value than the device tag. The OLE objects in FIGS. 3 and 4A–4C immediately below a quoted collection name, such as the PhysicalTag object, the DeviceTag object, and the DeviceID object, are also referred to as collections because they are related to constructs which a DDL considers or defines as collections.

In lieu of, or in addition to having a device tag, a physical tag and/or a device ID, a device can be identified by its physical communication connection to an FMS system. Specifically, each device is connected to an FMS network (illustrated in FIG. 3 by the Network object which is a "Net" collection of the Root object) through one of a number of networks, each or which is identified generically by the expression TCP/IP Node Name.

Each network includes a series of nodes, identified in FIG. 3 by the NetNode object. A network node includes a set of ports (illustrated by the Port object) which may have names of, for example, "Com1" or "Com2". The port may connect to a device through a modem (identified by the Modem object) and at one of sixteen station addresses, each of which is identified by a different StationAddress.

The port of a network node may also connect to a device through one or more HART interface units (HIU's) (identified by an HIU object) having a Station Address. Each HIU includes one or more interchanges (identified by the Interchange object) each of which typically includes 8 lines identified by Line Number. Interchange objects also include a method (which, contrary to the above-stated general rule about quoted names, is identified by the label. "Block") which returns an interface to the particular Block object that describes the HIU.

A network node can also be coupled to a device through one or more different DCS's, for example, the RS3, Provox, or other DCS's. Although FIG. 3 illustrates each of these ELS connected through a generic DCS object, the actual connection to an RS3 DCS, for example, would be made and could be identified in FIG. 3 by a node number, a card number, a port (typically one of four ports in a card) and a line (typically four lines per port). However, because the configurations of these DCS systems are not yet fully developed, the actual connections with each are not shown and the DCS object is not mentioned in the OLE Object Definitions table.

Furthermore, a network node may be coupled to one or more Fieldbus interface cards. However, because the Fieldbus devices are not yet being sold, the exact connection to a device is not yet known and, therefore, this connection is not represented in the hierarchy of FIG. 3. However, such a Fieldbus connection could easily be added by showing a Fieldbus object and any other OLE objects related to the components required for a Fieldbus connection from between a network node and a device between the NetNode object and the Device object.

Once a device is identified in any manner specified above, a block within the device can be uniquely determined by the "Tag" collection, illustrated as the Tag object, having the HART Tag name. If the device is a HART device, the contents of which are represented by only one conceptual block, the block is already uniquely identified and can simply be specified by the "HART" collection. The names of the tags related to the Tag object are specified as HART Tag in FIG. 3 because the HART tag of HART devices is used as this identifier. However, other tags for other types of devices could be used instead.

As suggested above, a Block object and, correspondingly, a block of a process, can be uniquely identified by traversing any of the above defined paths through the upper hierarchy of FIG. 3. Likewise, every other OLE object within the hierarchy of FIGS. 3 and 4A–4C can be identified by a unique moniker derived by traversing a path from the Root object at the top of tile hierarchy of FIG. 3 through to the particular OLE object. Thereafter, the properties and methods of any of the OLE objects within the hierarchy of FIGS. 3 and 4A–4C can be referenced and obtained using the moniker developed for that OLE object.

More particularly, a moniker can be determined from the hierarchy of FIGS. 3 and 4A–4C by compiling a string comprising the quoted and the unquoted/underlined expressions encountered in traversing a path from the Root object in FIG. 3 to the OLE object of interest, and separating these expressions with an exclamation point ("!"). For example, the moniker for a Block object can be any of the following:

Root!BlockTag!Block Tag!

Root!PhysicalTag!HART Tag!Tag!HART Tag

Root!DeviceID!Unique Identifier!HART

Root!Net!TCP/IP Node Name!Port Name!Modem!Station Address!Tag!HART Tag

As will be evident, monikers for other OLE objects illustrated in FIGS. 3 and 4A–4C can be developed using this format. The "NamedConfig" collection of the Root object of FIG. 3 (represented by the NamedConfigs object) relates to objects which are stored in the FMS database 40 and which are not available from a device. Each NamedConfigs object is identified by a ConfigName to specify a particular NamedConfig object. A NamedConfig object may include, for example, a "recipe" or particular configuration of a block necessary for implementing a particular function within a process, a past configuration of a block within a process, or for that matter, any other desired user information related to Block objects. However, to the server network 66 of FIG. 2, each. NamedConfig object looks similar to a Block object except that the parameter value data of a NamedConfig object is retrieved from the FMS database 40 as opposed to being retrieved from a device. NamedConfig objects may have a subset of the information typically associated with a Block object.

The lower hierarchy of FIG. 4A–4C illustrates an interrelationship among the data associated with each block of a system. Therefore, as illustrated in FIG. 4A–4C, each Block object (and each NamedConfig object) includes a set of, collections denominated "Param," "Unit," "Database," "Refresh," "ItemArray," "Collection," "Menu," "Method," "EditDisplay," and "WAO," each having an associated (although slightly differently named) OLE object. Each of these OLE objects, in turn, have other OLE objects related thereto as defined in FIGS. 4A–4C. Thus, for example, a Parameter object identified by a Param Name may be a VariableParameter object, a RecordParameter object or an ArrayParameter object. If it is a VariableParameter object, it includes collections of "IndexedItemArray," "Enum," "PreEdit," and "PostEdit," all having associated OLE objects. The EnumerationValues object (a collection of the VariableParameter object for variables of the enumerated type) has particular enumerated values identified by the Enumeration Value object which, in turn, includes a collection of Method objects. These Method objects may, for example, include methods of getting or changing enumerated values of a VariableParameter object.

The property, data, and methods stored in, or associated with, all of the OLE objects within FIGS. 4A–4C, except for the DatabaseParameters and DatabaseParameter objects, represent information which is available from or through the use of DD's or a device conforming to a DDL. The data and method of the DatabaseParameters objects and DatabaseParameter objects are stored in a database.

As with FIG. 3, any OLE object in FIGS. 4A–4C can be uniquely identified by a moniker developed by tracing a path from the Rcot object of FIG. 3 down to the particular OLE object of interest. Thus, for example, the moniker for a pre-edit Method block could be constructed by adding onto the end of the moniker for any Block object of FIG. 3, which is also represented by the Block object of FIGS. 4A–4C the expression !param!Param Name!PreEdit!Index.

Once a moniker is established for a particular object within the hierarchy of FIGS. 3 and 4A–4C and stored in the memory associated with the server network 66, the DCI 60 and the server network 66 can, thereafter, operate on and access that OLE object using a shorter unique "handle" generated by the server network 66. The handle may, for example, comprise a unique number identifying an OLE object which has been stored in the memory of the server network 66.

In essence, with a unique moniker or the handle, any OLE object identified by the hierarchy of FIGS. 3 and 4 can be immediately accessed by the DCI 60 or the server network 66 and the methods within that OLE object can be invoked in order to accomplish communication with the DDS, a database, a smart device, or other OLE objects as necessary. Thus, for example, the software routine within the server 68 which accesses the DDS 72 to retrieve a particular parameter value from a particular device can be initiated when a call to the proper VariableParameter object is initiated by the DCI 60 using a command which tells the OLE VariableParameter object to read a parameter value.

As is evident, the server network 66 communicates with the database 40, the DDS 72, and the on-line devices transparently to the DCI 60 and the current application 56, because the server network automatically accesses the interrelationships between the OLE objects identified by the lower hierarchy of FIG. 4 to determine which set of routines to implement in order to obtain new information requested by an OLE object or a DDS.

It should be noted that, for any OLE object of FIGS. 3 and 4A–4C to be accessed, the OLE objects above that OLE object in at least one path between that OLE object and the Root Object FIG. 3 must be stored in the server network memory. Thus, for example, when accessing a VariableParameter object of a parameter for a block, the Parameter object and the Block object associated with that parameter and that block will also be stored in the server network memory. The Device object, the DeviceID object and the Root object may also be stored in the server network memory. Without these higher level objects, the server network 66 can not access enough information to determine how to locate and retrieve the data of the VariableParameter object.

As will be apparent to those skilled in the art, the DCI 60 may operate to communicate with and retrieve information from the OLE hierarchy represented by FIGS. 3 and 4A–4C by performing relatively simple routines which, for example, (1) create an object hierarchy and associate it with the server network 66, (2) traverse the object hierarchy to explore the objects below a specified object, (3) implement standard OIE methods like Item, which traverses a specific path from one object to another, and NewEnum, which creates an interface to enumerate objects one level below, (4) implement methods related to Block objects which may include methods related to DDL operations, (5) read and write Root and Device object properties, (6) initiate and control non-blocking read and write requests from OLE objects, (7) retrieve results from blocking reads and writes, (8) control changes to the database 40, and (9) control the creation and maintenance of an event log that includes information pertaining to, for example, user changes to the system including change times, identification of the persons and the computers which made the changes, etc.

As a result, an application for the FMS system 10 does not have to be specifically programmed to interface with a DDS, database or smart devices which, in turn, allows an application developer to be much less knowledgeable with respect to DDL formats, DD's and smart device communications.

It will be noted that, using the hierarchy of FIGS. 3 and 4A–4C as described above, any application implemented by the FMS system 10 can interface with FMS devices using, for example, any OLE-compatible programming environment to gain access to the IUnknown and IDispatch interfaces associated with each object in the hierarchy. It is considered that Visual Basic programs and C++ programs are well-suited to use the above-defined OLE hierarchy.

Furthermore, although the hierarchy of FIGS. 3 and 4A–4C is specifically related to the Fieldbus DDL and to the HART DDL, which is very similar to the Fieldbus DDL, it is considered that this or a similar hierarchy can be made for other DDL's associated with other smart devices including, for example, Modbus smart devices in accordance with the present invention. Furthermore, it is considered that the hierarchy of FIGS. 3 and 4A–4C can be implemented by other object-oriented programming protocols and even by non-object oriented programming protocols.

The functionality of the interface block 58 will now be described in more detail. As noted above, during operation, the current application 56 calls the interface block 58 to initialize one or more specific controls which, thereafter, automatically handle all operations associated with interfacing between the Windows operating system 49, the smart devices within the process 12 and/or the FMS database 40 with respect to a device, a block, or a parameter associated with the process 12. The interface block 58 may also change the Time property of the Root object stored in the memory of the server network 66 to control displays in an advantageous manner.

Each control of the interface block 58 displays and updates information pertaining to a devIce, a block, a parameter, or a time on the display 30; communicates with the smart devices, the database 40, and the server network 66 in response to user or application inputs to retrieve data from, or write data to, the DDS 72, the smart devices, the database 40, or the Root object in the server network 66, without further involvement of the current application 56. Importantly, once established, a control generally appears to run independently of the current application 56 and of other controls which may have been established.

Figure 5:
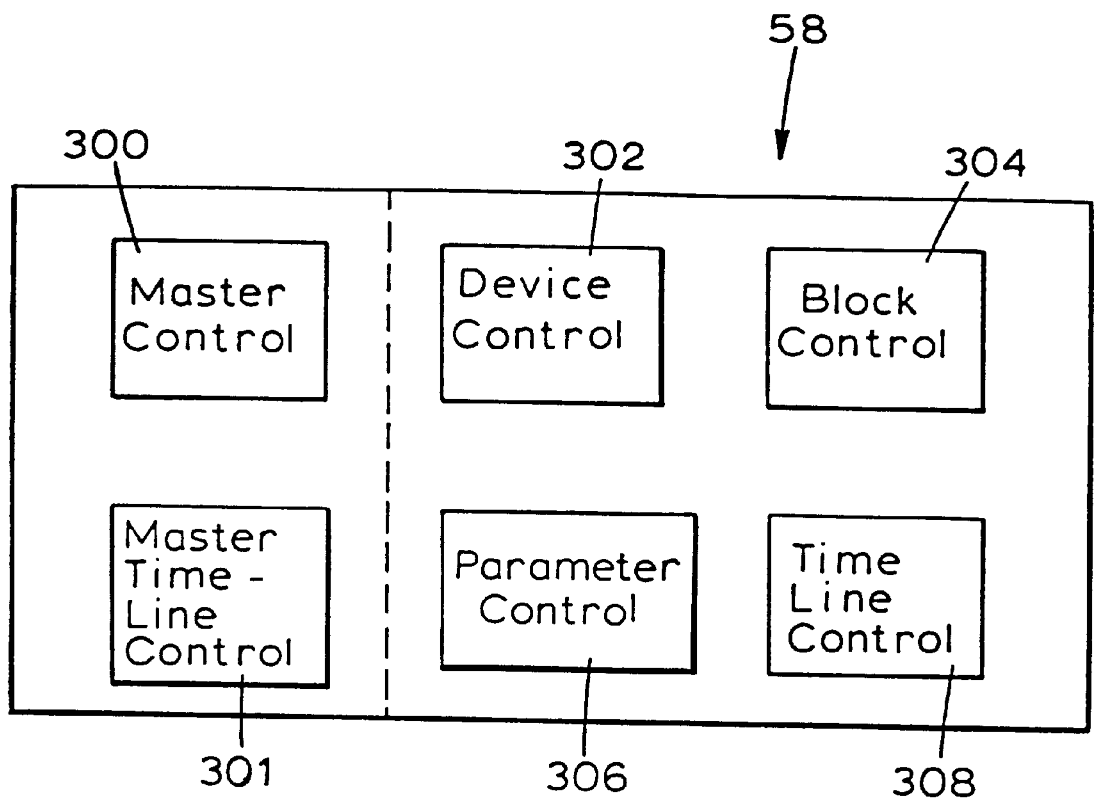
FIG. 5 illustrates the interface control block of FIG. 2.

As illustrated in FIG. 5, the interface block 58 includes a master control routine 300 which can be used to implement control functions, including control functions relating to a device, a block, or a parameter associated with the process 12. The interface block 58 also includes a master timeline control routine 301 which can be used to implement control functions such as reading and writing times from the Root object and changing time values from the database 40.

When the current application 56 calls the interface block 58 to implement a device, block, parameter or timeline control, one of the master control routines 300 or 301 is, in effect, copied and converted into a specific control routine or control. Such specific controls are illustrated in FIG. 5 as a device control 302, a block control 304, a parameter control 306 and a timeline control 308. The specific controls 302, 304, 306, 308 thereafter automatically handle functions related to communication between the Windows operating system 49, the current application 56, the database 40 (through the DCI 60), the DDS 72 (through the DCI 60), and the on-line smart devices (through the DCI 60) as those communications relate to the specific devices, blocks, parameters, or timelines for which the controls are created. Once established, each of the controls 302, 304, 306, 308 operates continuously and independently of the other controls and the current application 56. Any number of the same and/or different control types can be implemented to operate at the same time.

While FIG. 5 illustrates the controls 302, 304, 306, 308 as separate routines which are copies of one of the master control routines 300 or 301, controls 302, 304, 306, 308 can also contain the data necessary to implement a particular device, block, parameter, or timeline control using one of the master control routines 300 or 301.

Figure 6:
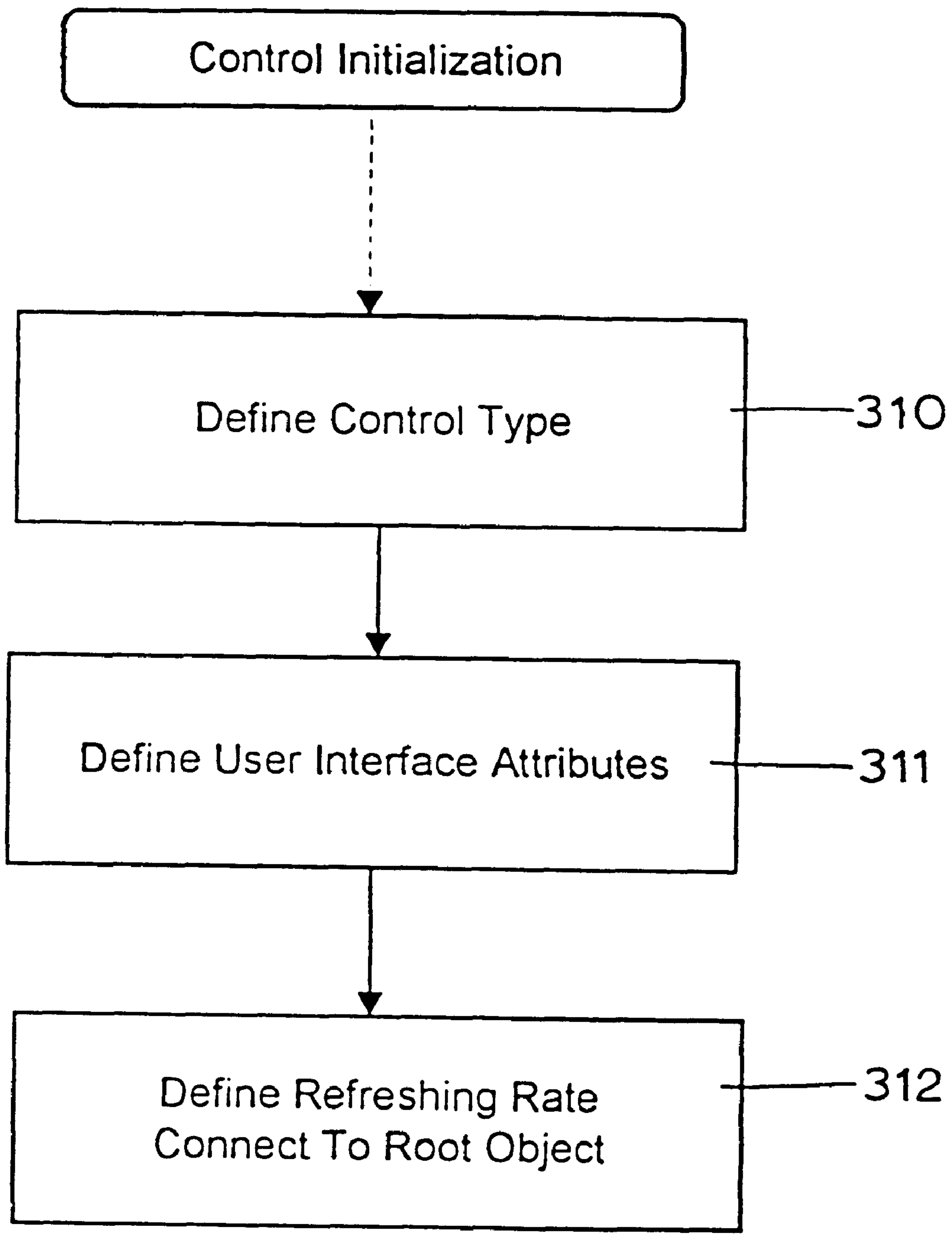
FIG. 6 is a flowchart illustrating the initialization steps associated with a control constructed according to the present invention.

FIG. 6 generally illustrates the steps that should be performed by, for example, the current application 56 to initialize a control, including any of the controls illustrated in FIG. 5. A block 310 defines the type of the control, for example, a device, a block, a parameter, or a timeline control, by providing the interface block 58 with a unique moniker pointing to the OLE object within the hierarchy of FIGS. 3 and 4A–4C with which the control is associated. Because, conceptually, an instantiation of the hierarchy of FIGS. 3 and 4A–4C exists for each time available to the FMS application, the timeline control specifies the Root object of a particular hierarchy by specifying, for example, the time and view of the Root object with which the control is associated.

A block 311 defines the user interface attributes including, for example, the fonts, sizes, etc., of display characters, the style in which the information is to be displayed, the display screen location at which the control information is to be displayed, the initial window size of the control display if the size of a control display is capable of being changed by the user, and the so-called "visibility" of the control. Control visibility defines whether the control will actually be displayed or be visible on the screen. While an invisible control still operates to retrieve data from its associated OLE object and may provide such information to the current application 56, the user interface operations of that control are simply disabled.

A block 312 defines the refresh rate of the control (i.e., the rate at which the control will receive information from its associated OLE object in a periodic read). In effect, the block 312 connects the control to a particular Root object of the hierarchy in FIGS. 3 and 4A–4C, and the Root object defines the rate at which the OLE object will refresh data in response to a periodic read.

Figure 7:
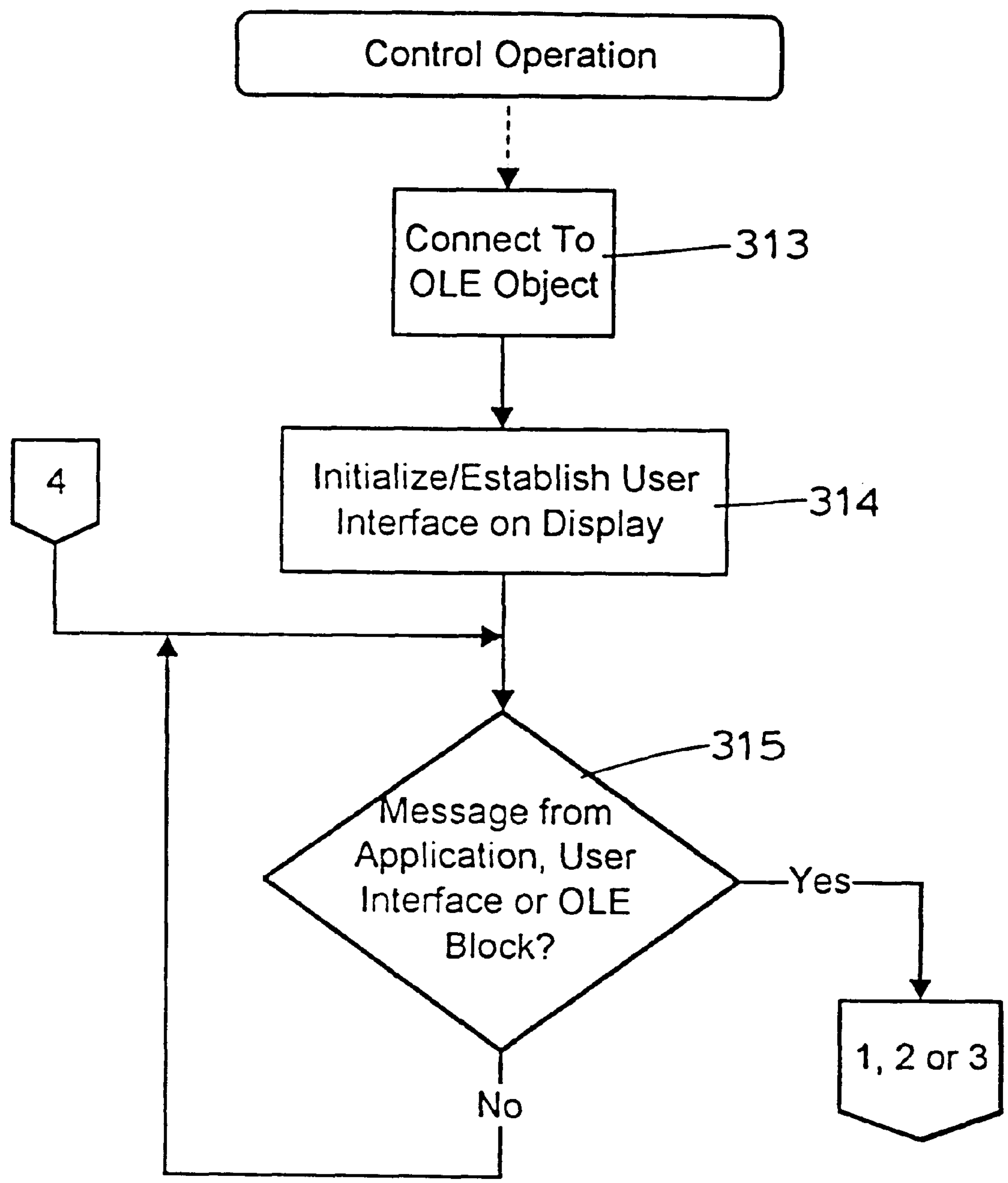
FIGS. 7–13 are flowcharts illustrating the operation of controls according to the present invention.

FIG. 7, illustrates the general operation of a control routine which can be used for the device control, the block control, the parameter control and the timeline control of FIG. 5. A block 313 connects to or establishes a connection to the proper OLE object as defined by the hierarchy of FIGS. 3 and 4A–4C and the moniker provided by the current application 56. Specifically, the control sends a command through the DCI 60 to the server network 66 to read information, for example, the properties, of the OLE object associated with the control. Preferably, this command is a periodic read which tells the OLE object, such as a device, a block or a parameter object, to periodically send the requested data to the control.

In response to the read, the server network 66 establishes a connection to the OLE object by retrieving the data thereof from the DDS 72, the smart devices and/or the database 40, and stores that data as the OLE object in a server network memory. To perform this read function, however, the server network 66 must also store in its memory the data pertaining to the Device and/or Block objects above the requested OLE object as defined by the hierarchy of FIGS. 3 and 4A–4C. When stored in the server memory, the requested OLE object data is sent to the DCI 60 and then to the interface block 58 where this data may be stored in a memory or control cache associated with the interface block 58.

A block 314 then establishes or initializes a user interface screen on the display 30 for the particular control as defined by the user interface attributes provided to the control by the block 311 of FIG. 6. The display attributes may be configured to display control information in any desired manner using standard Windows calls and Windows formats. An exemplary screen for each of the device, parameter, block, and timeline controls is illustrated in FIGS. 14–17.

Next, a block 315 checks to see if any messages have been received from the application, the user interface via the Windows operating system 49, or an OLE block through the DCI 60. If no such messages have been received, the block 315 continually rechecks for such messages. When the block 315 receives a message, control is transferred as indicated by the identifiers labeled 1, 2, and 3.

Figure 8:
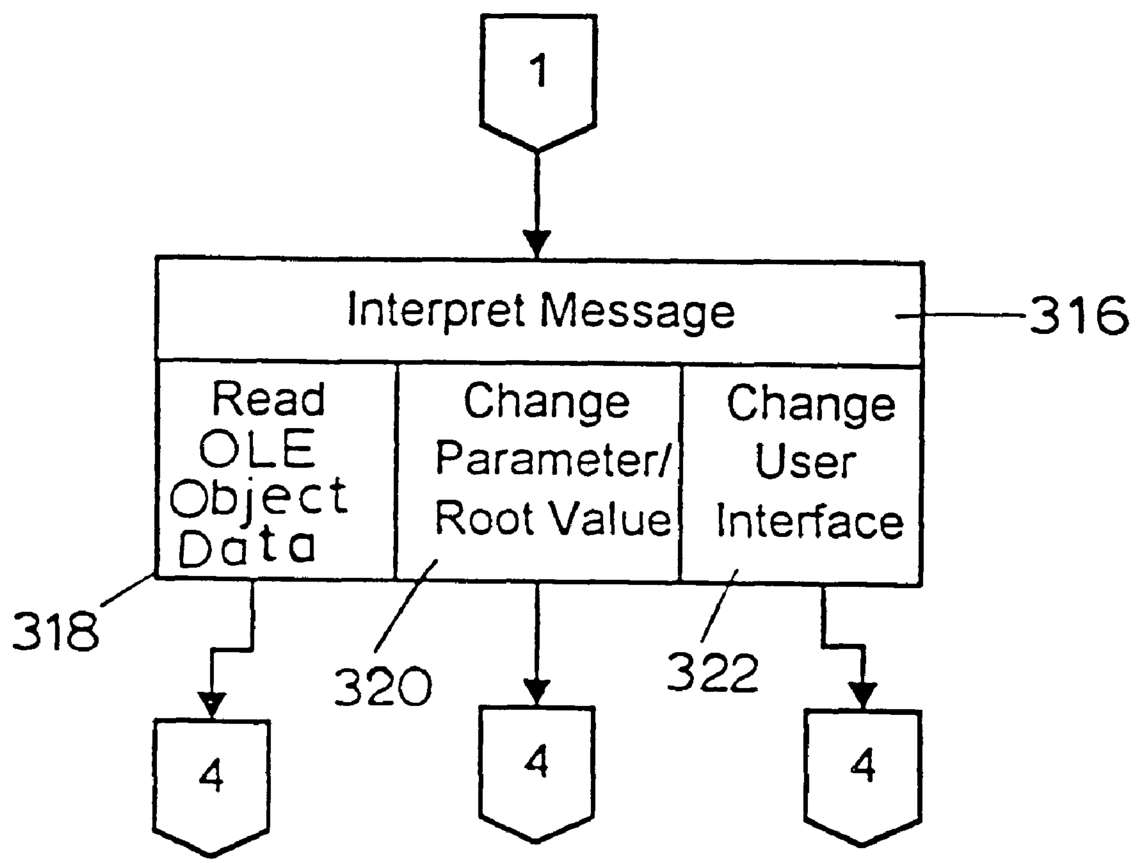

FIG. 8 illustrates the operation of a control in response to a message from the current application 56. A block 316 interprets the message which can be of three general types, including a read OLE object data message, a charge Parameter object value, or a Root object value message and a change user interface message. In response to a read OLE object data message, a block 318 reads the requested data from the referenced OLE object of FIGS. 3 and 4A–4C. For example, a device control may read the DeviceID property or the "Tag" collection of a Device object while a block control may read the Name property or the "Param" collection of a Block object. A parameter control might read parameter properties such as the value or name of a VariableParameter object. A timeline control can read Root object properties and may obtain a list of times for which Root objects exist in the past from the database 40. Thereafter, the block 318 returns control to the block 315.

In response to a change-parameter or root-value message, a block 320 implements a change to the referenced parameter object, for example, the VariableParameter object, RecordParameter object, or ArrayParameter object of FIG. 4A–4C and returns control to the block 315. In response to a change-user-interface message, a block 322 implements a change of the user interface and returns control to the block 315.

Figure 9:
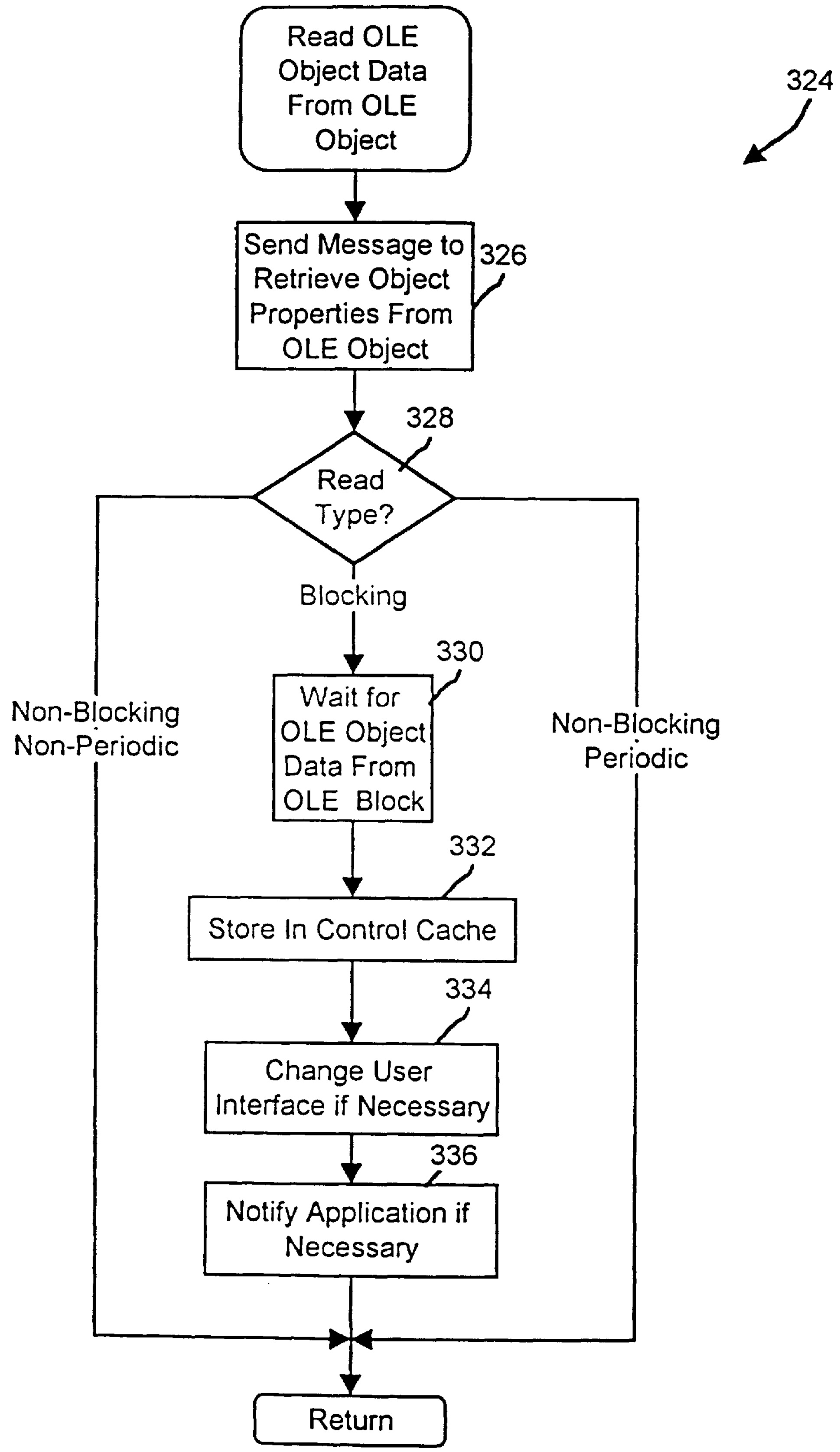

FIG. 9 illustrates a routine 324 which is implemented by a control during a read OLE object data procedure. Specifically, a block 326 sends a message through the DCI 60 to the OLE object associated with the control to retrieve data from that OLE object. Thereafter, a block 328 determines what type of read message was received. If a non-blocking, non-periodic or a non-blocking, periodic read message was received, the block 328 returns control to the block from which the routine 324 was called. A non-blocking read refers to one in which the control sends a read message to the OLE object associated with the control and does not wait for a response from the OLE object before continuing with other functions. A non-periodic read is a request for a single, one-time read from the OLE object associated with the control. A periodic read instructs the OLE object to periodically notify the control of changes which occur to data within the OLE object at a rate defined within the Root object associated with that OLE object.

If, however, the read was a blocking read, which is always a non-periodic read, a block 330 waits for the return data requested from the OLE object. Next, a block 332 stores the received OLE object data in the control cache. If necessary, a block 334 changes the user interface by calling a user interface change routine described hereinafter to reflect the new data obtained by the read. A block 336 notifies the current application 56 if the application has identified that it wants to receive messages or data changes from OLE object data reads during, for example, initialization of the control. Thereafter, control is returned to whatever block called the routine 324.

Figure 10:
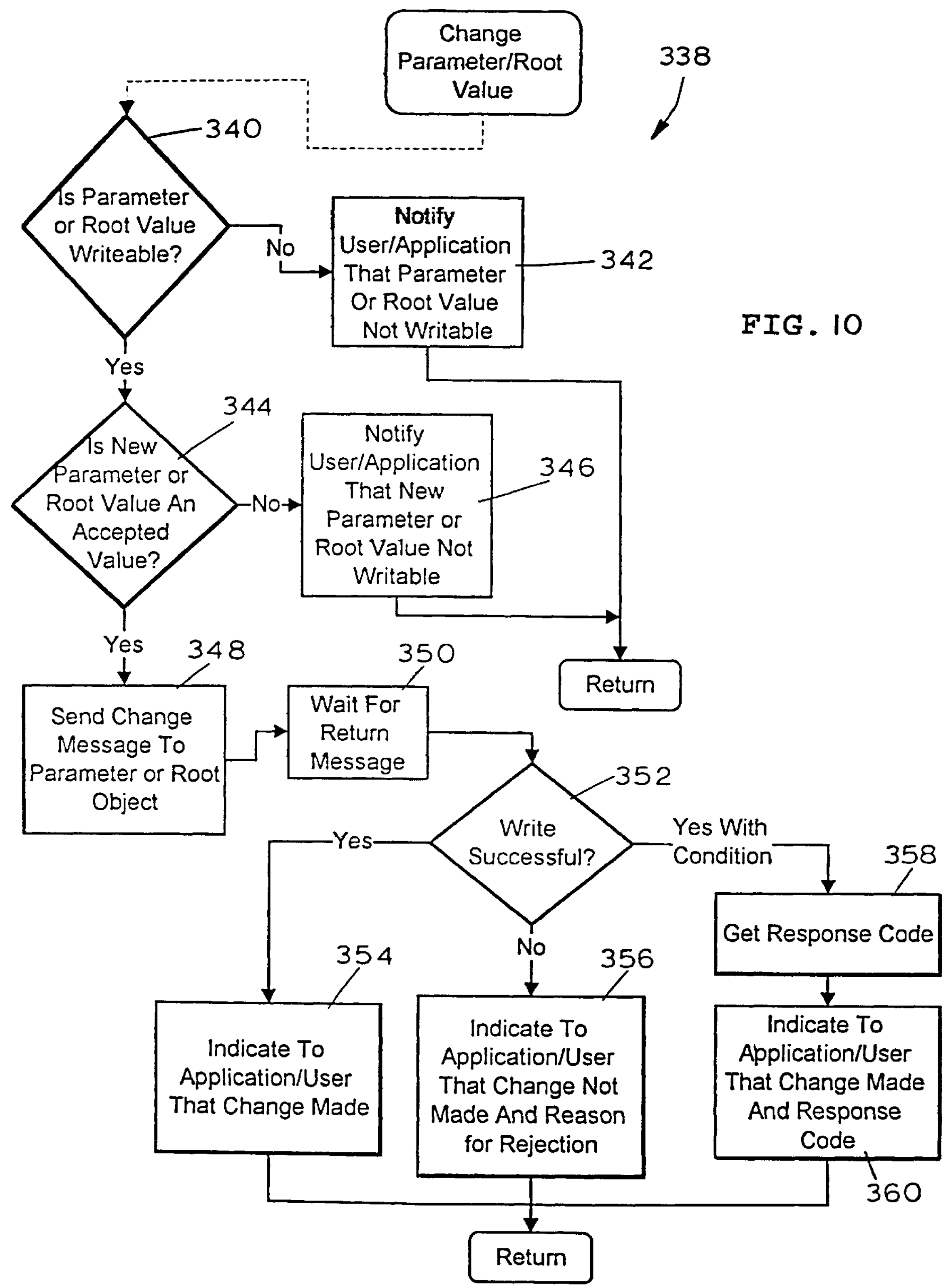

FIG. 10 illustrates a routine 338 which is implemented by a control during a change of a parameter or root value of an OLE parameter object (such as the VaribleParameter object) or a Root object. A block 340 determines whether the parameter or root value indicated to be changed is writable. In essence, the block 340 sends a message to read the handling properties of the OLE object and determines whether the parameter value is writable. If the block 340 determines that the parameter or root data value is not writable, a block 342 notifies the user or the current application 56 that the parameter or root value is not writable, such as by calling the change-user interface routine described below. Thereafter, control is returned to the block from which the routine 338 was called.

If, on the other hand, the block 340 determines that the parameter or root value is writable, a block 344 determines if the new parameter value (or root value) is an accepted value. To perform this function, the block 344 reads, for example, the value characteristics of the parameter object associated with the control such as the minimum value, the maximum value and the type of value accepted which may be, for example, a variable, an enumerated set, etc. If, thereafter, the block 344 determines that the new value is out of range or of the wrong type, a block 346 may send a message to the application and/or may change the user display to indicate that an unacceptable value has been entered. Thereafter, control is returned to the block which called the routine 338.

If the block 344 determines that the new value is an accepted value for a parameter or a root object, a block 348 sends a change message to the correct OLE parameter or root object through the DCI 60. The new value is then changed in the OLE object which, of course, may cause a corresponding change in a smart device or in the database 40.

A block 350 waits for a return message and a block 352 decodes the return message to determine if the write was successful. If the write was successful, a block 354 may indicate to the application and/or to the user via the user interface that the change was made (e.g., by changing the color of the background of the data on the screen).

If the block 352 determines that the write was not successful, a block 356 indicates to the application and/or to the user via the user interface that the change was not made (e.g., by changing the data on the screen to its original state). Incidentally, the response codes associated with an OLE object are always available to an application so that the reason for the rejection can be determined and/or displayed to the user.

If the block 352 determines that the change was made but that a write condition exists, a block 358 retrieves a response code from the OLE object by specifically initiating a proper read from the OLE object. A block 360 then indicates to the application, and/or to the user if desired, that the change was made but that a write condition exists. The block 360 may also indicate the type of condition that exists (e.g., that the OLE object property was set to the nearest available possible value). Each of the blocks 354, 356, and 360 returns control to the block which called the routine 338.

Figure 11:
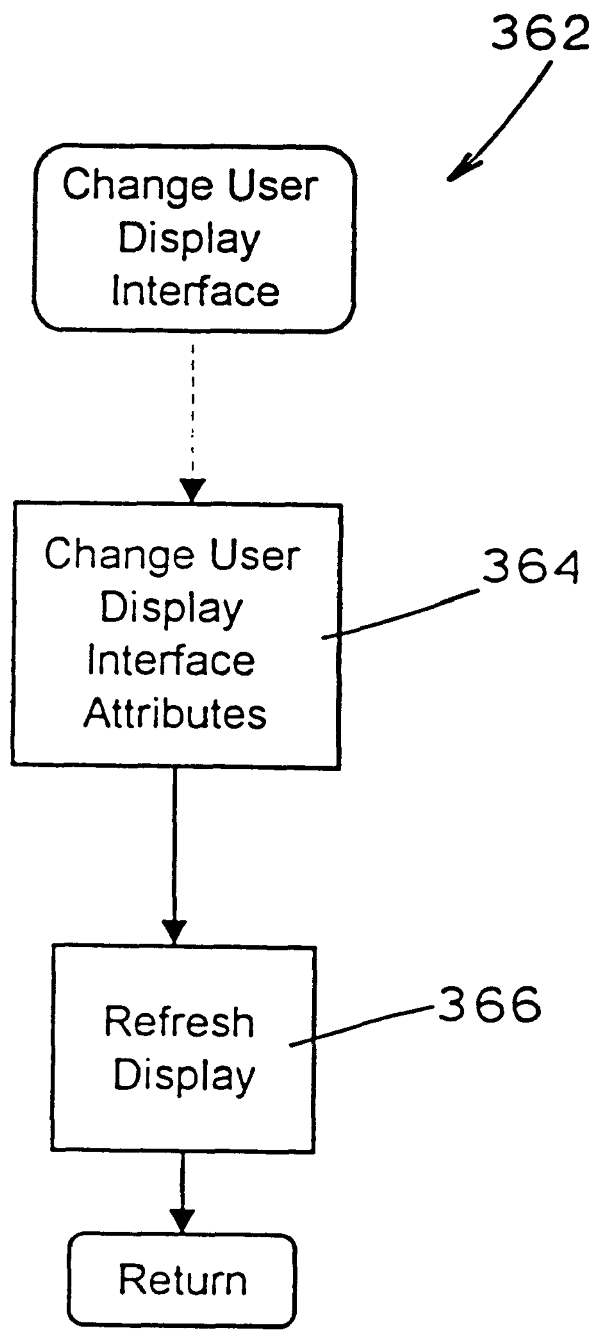

FIG. 11 illustrates a routine 362 which is implemented by a control to change the user interface display. A block 364 changes the display interface attributes in conjunction with new attributes provided by the current application 56, or in accordance with a set of attributes previously defined by the control for the condition which now exists. These previously defined attributes may be stored in a memory associated with the control, such as the control cache. A block 366 refreshes the user display using the new user display attributes and the data in the control cache which is to be displayed. Thereafter, control returns to the block from which the routine 362 was called.

Figure 12:
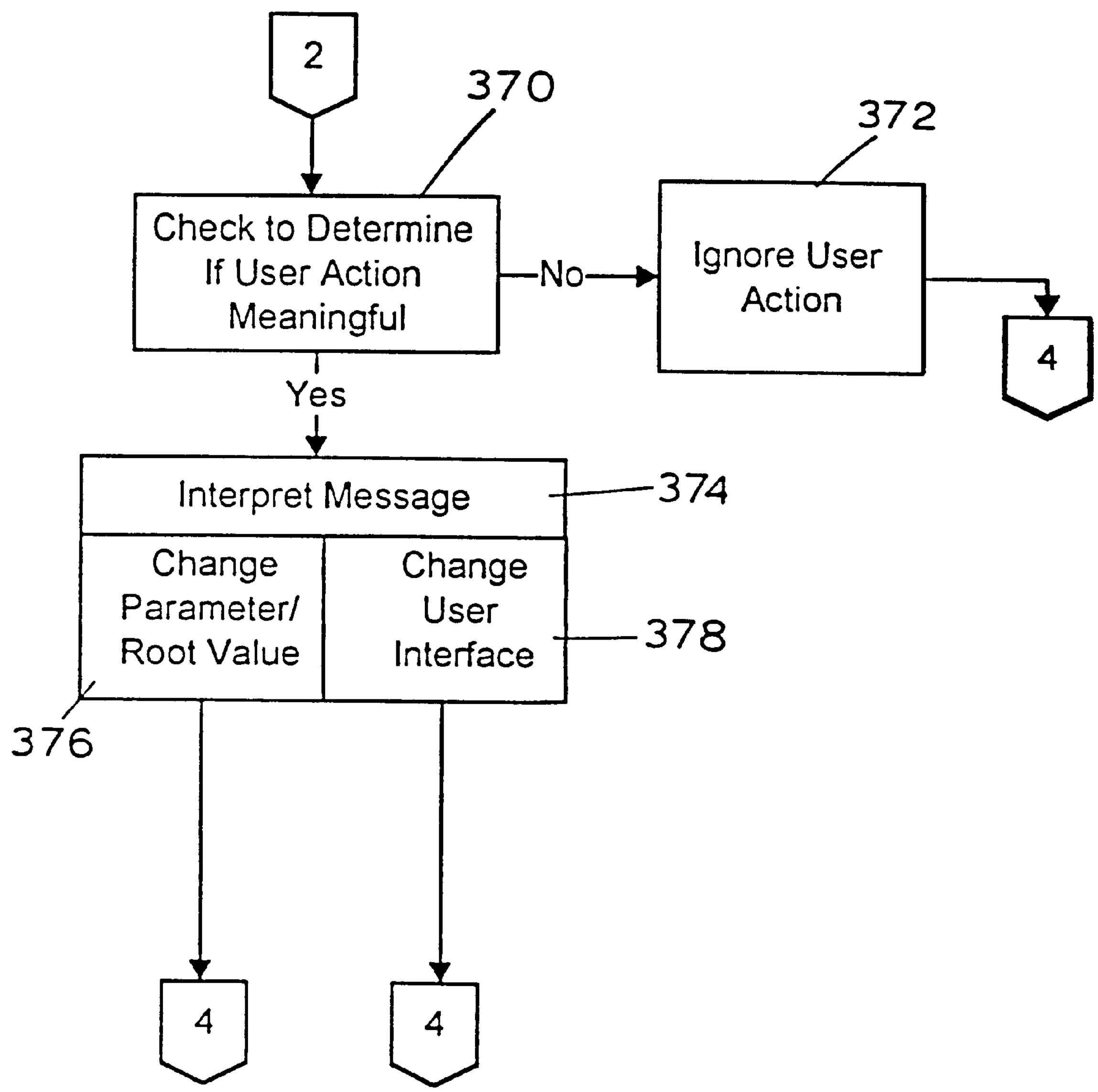

FIG. 12 illustrates the operation of a control in response to a message from the user interface. A block 370 checks to determine if the user action is meaningful. The block 370 may, for example, determine if the user clicked the proper button of the mouse or if the pointer (i.e., the cursor or arrow) was located within an area of the control display where the control :recognizes the user's actions as requests for action. If the user action is not meaningful, a block 372 simply ignores the user action or gives some indication that the action has been ignored (e.g., refreshing the user display with the same display interface attributes). Thereafter, control is returned to the block 315.

On the other hand, if the user action is meaningful, a block 374 interprets the message from the user interface. If the message from the user interface indicates that the user would like to change a parameter value or a root value, a block 376 calls the change-parameter/root-value routine 338 and then returns control to the block 315. If desired the block 376 may also change the user interface, for example, to implement a color change to the background field surrounding the data to be written. Upon receiving an indication of a successful write, the block 376 may also return the background color to its original state to indicate that the value has been written (if the routine 338 has not already done so).

If, on the other hand, the block 374 determines that the user is requesting a change in the user interface, a block 378 calls the change-user-interface routine 362 and returns control to the block 315.

Figure 13:
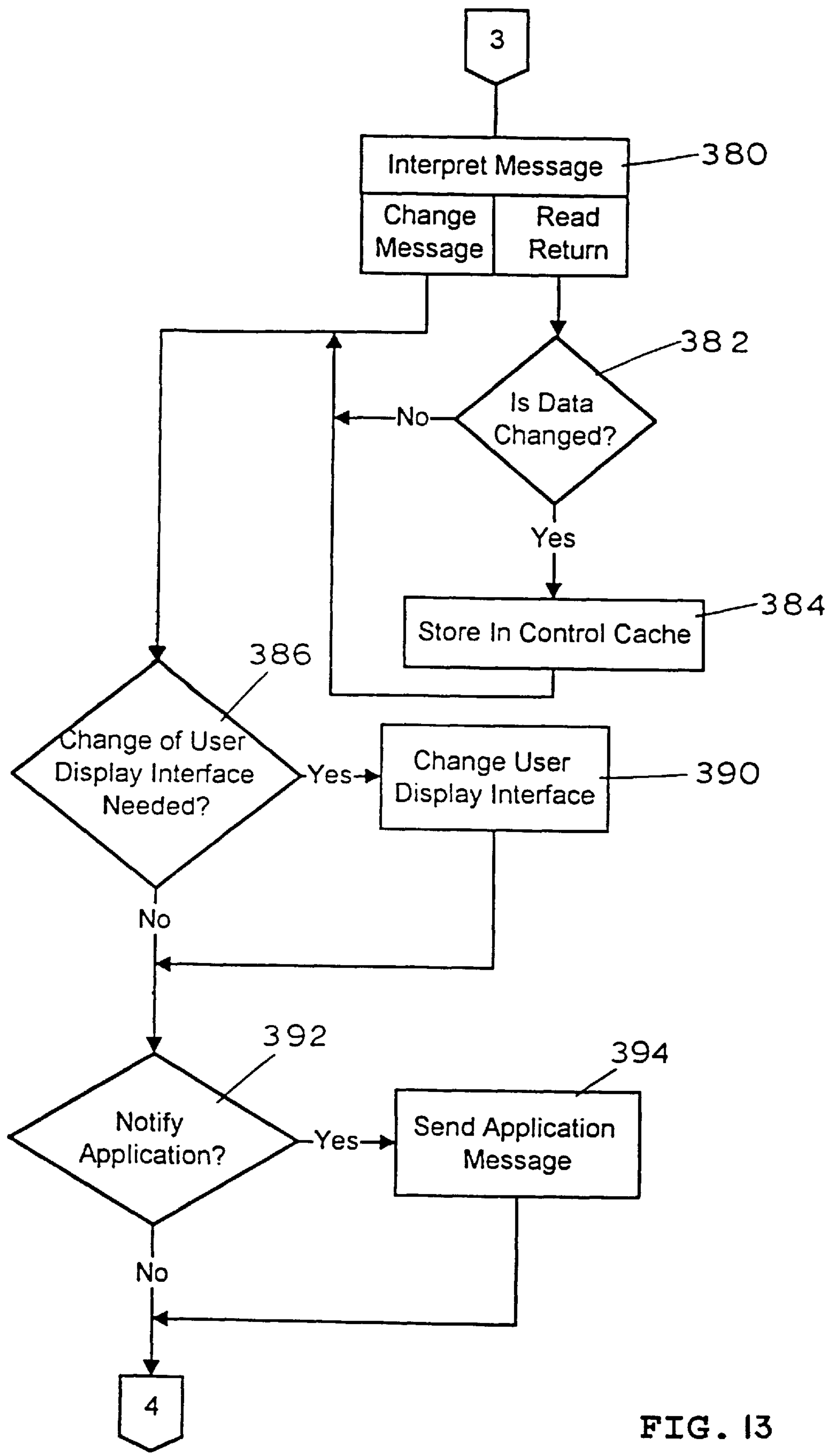

FIG. 13 illustrates the operation of a control in response to a message from the DCI 60, i.e., from an OLE object within the hierarchy of FIGS. 3 and 4A–4C block 380 first determines if the message from the DCI 60 is non-blocking read return or if the message indicates some other change or changed condition within the referenced OLE object of the OLE hierarchy. A condition-change message may, for example, comprise an FMS locking message which prevents multiple users from accessing a particular block within a device of a process at the same time. If, for example, a block is being accessed by a different user by a hand-held communicator or another FMS system attached to the device, the OLE object will identify such condition to the control through the DCI 60. Thereafter, the control may indicate to the user that the data of that block is no longer writable by, for example, displaying a gray background on the screen surrounding a normally writable value.

In the case of a non-blocking read return, a block 382 determines if the returned value has changed. If so, a block 384 stores this new value in the control cache. The block 384 and, if there has been no change in the data stored in the control cache, the block 382 provides control to a block 386. The block 386 is also implemented if the block 380 determines that the message from the OLE object relates to a change not related to a non-blocking read.

The block 386 determines if a change to the user interface is needed, such as if the changed data or the new condition or status is to be displayed on the screen. If so, a block 390 calls the change-user-interface routine 362 to display the changed data or the condition to the user. If, however, the block 386 determines that the changed data or the condition does not need to be displayed, or if the block 390 has indicated such changed data or condition to the user, a block 392 determines if the application should be notified of the changed data or condition in accordance with pre-written instructions. If so, a block 394 sends a message to the current application 56 indicating the changed data or condition. Thereafter, control is returned to the block 315.

Generally, information accessed by a device, a block, a parameter, or a timeline control can be displayed on a screen in any desired manner including (1) the EDIT style wherein the control behaves similarly to a normal Microsoft Windows Edit control, (2) the COMBO style wherein the control behaves similarly to a normal Microsoft Windows Combo Box control (i.e., as a drop down list), (3) the LIST style wherein the control behaves similarly to a normal Microsoft Windows List Box control (i.e., such that each item in the enumeration will be represented as a list box entry), (4) the GROUP style wherein the control behaves similarly to a normal Microsoft Windows Group Box control, or (5) the PANEL style wherein the control displays either a raised or a sunken panel and/or any other desired style or format.

Figure 14:
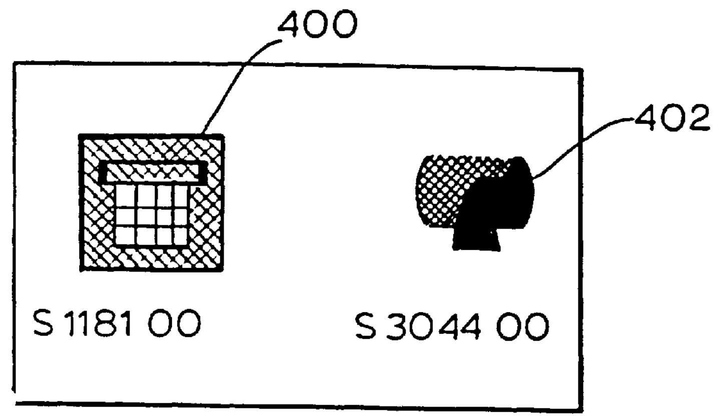
FIG. 14 is a screen display which can be generated by a set of device controls according to the present invention.

FIG. 14 illustrates control displays 400 and 402 associated with two device controls. Each of the device control displays 400 and 402 includes a picture or digital bitmap of the device (usually provided by a device manufacturer or the DDS provider), which is stored in a memory associated with the current application. Instead, this bitmap may be stored in the database 40 so as to be accessible by the OLE objects.

The control displays 400 and 402 may include any other desired information about a device including, for example, the name (illustrated in FIG. 14), tags, moniker, etc. of a device, or any other desired device-specific information. Furthermore, menus for the device can be provided in a pull-down window associated with the device control displays 400 and 402. Such menus may include files associated with a device, for example, the names of the collections associated with a Device object for the device, methods which can be implemented on the device, including calibration, resetting, and self-testing methods, blocks associated with the device, a list of parameters associated with the device, help for the device, service notes for the device, etc. Other information about a device which may be displayed includes the contents of every variable of each parameter in a device, the face-plate information of a device, the operational status of the device, including, for example, whether an error has occurred within the device and a side-by-side list of, for example, the values of variables of one or more parameters of a device as they exist or existed at specified times.

Figure 15:
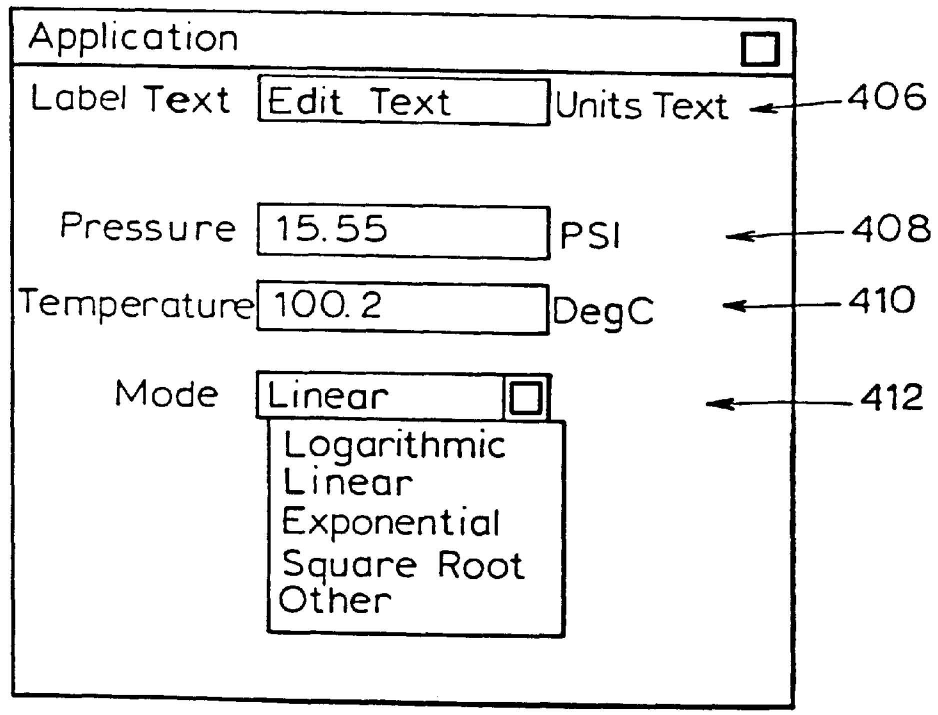
FIG. 15 is a screen display which can be generated by a set of parameter controls according to the present invention.

FIG. 15 illustrates a general parameter control display 406 along with particular parameter control displays 408, 410, and 412 associated with three specific parameter controls for the parameters of a device. Each of the parameter control displays 406–412 is located at a different portion on a screen and, in particular, the parameter control display 406 is located at the top of the screen while the parameter control displays 408, 410 and 412 are located in sequence below the parameter control display 406.

The parameter control display 406 illustrates that a parameter control display may have three fields, including a label field, which provides information pertaining to the type of information being shown, for example, "Pressure," "Temperature," or "Mode," a value field which shows the value of a parameter and a units field which indicates the units in which the value is expressed. The value of a parameter can be an integer number, a decimal number (parameter control displays 408 and 410) or an enumerated value consisting of one of an enumerated set of values, as listed in a pull-down menu associated with the parameter control display 412. The parameter control display 412 does not include a units variable because such a variable is inapplicable to the enumerated set associated therewith.

Figure 16:
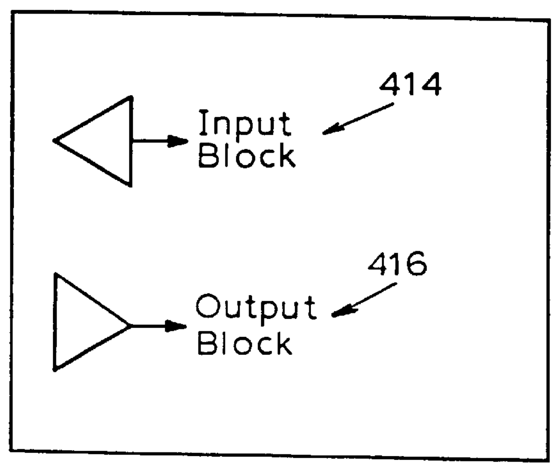
FIG. 16 is a screen display which can be generated by a set of block controls according to the present invention.

FIG. 16 illustrates two block control displays 414 and 416 associated with block controls. Similar to a device control display, a block control display typically includes a picture or other representation of a block and/or any other desired information pertaining to a block and/or the device in which the block is located including, for example, whether a block is an input, output, or control (or interface) block.

Figure 17:
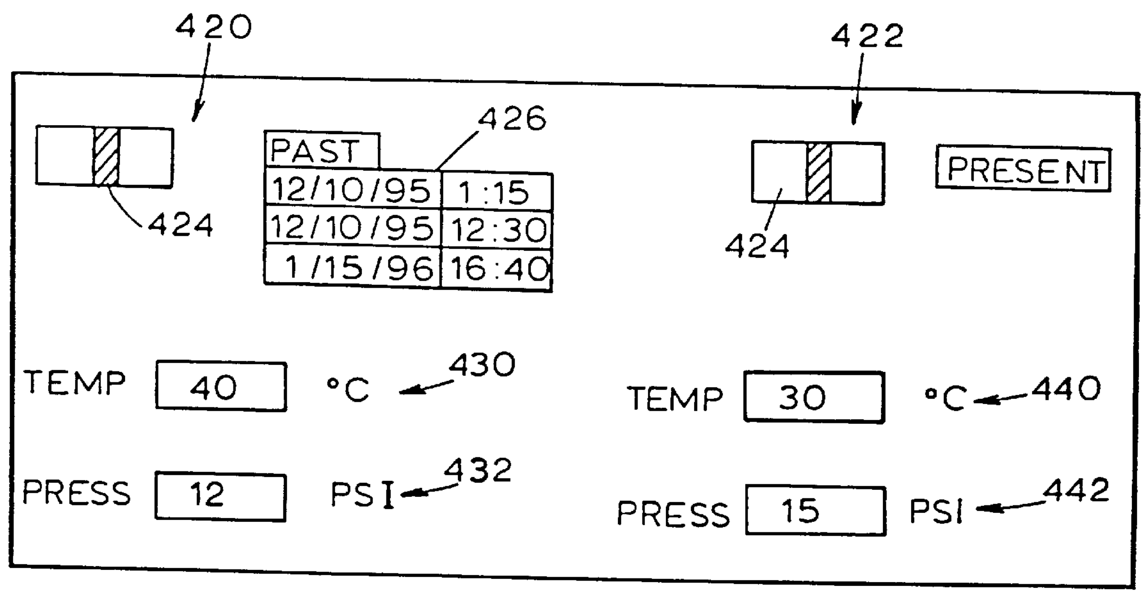
FIG. 17 is a screen display which can be generated by a set of timeline and parameter controls according to the present invention.

FIG. 17 illustrates two timeline control displays 420 and 422 which are used to control and change the time and view properties of OLE Root objects to which other controls, such as device, block, and parameter controls may be connected. Each of the timeline controls associated with the displays 420 and 422 can change the time value of its respective Root object to any of the previous times for which Root objects are available, which will typically include the past times when changes were made to the system and for which transaction records are stored in a transaction database of the FMS database 40 (FIG. 1). Furthermore, the timeline controls associated with the control displays 420 and 422 can change the view of a Root object between a past, a present, or a future setting.

Each timeline control display usually includes, as illustrated in FIG. 17, a slider 424 indicating which one of the past, present, and future views is selected as well as a combo box 426 which allows a user to select from a set of historical times, each having, for example, a date and a time.

By changing the timeline control slider 424, the user tells the timeline control to change the Root object View property associated with that timeline control. By changing the timeline control combo box 426, the user tells the timeline control to change the Root object time value to a specified time.

When a timeline control changes the time or view of a Root object, any other controls, such as parameter, device or block controls which are associated with that Root object will automatically be updated in response to change messages generated by the OLE objects. These change messages will be generated by the OLE objects when the OLE objects within the same hierarchy as the Root object retrieve new data pertaining to the new time or view now associated with the Root object.

FIG. 17 also illustrates temperature and pressure parameter control displays 430 and 432 which are connected to the same Root object as the timeline control associated with the timeline control display 420. Likewise temperature and pressure parameter control displays 440 and 442 are connected to the same Root object as the timeline control associated with the timeline control display 422. Because the timeline control displays 420 and 422 are set to different times, i.e., a past time (control display 420) and the present (control display 422), the values of the temperature parameters 430 and 440 are different and the values of the pressure parameters 432 and 442 are different. A list of such parameter control displays can be configured on the screen to display one or more complete configurations for a device, block, etc. Device and block and/or other parameter controls can also be associated with the same Root object as timeline controls and can be used to illustrate a configuration display which shows a configuration of a device, a block, or a parameter at different times in a side-by-side or other relationship on a screen. A timeline control can also be used in conjunction with other controls on a display to scroll through the settings or values of devices, blocks or parameters or a set of such device, blocks, or parameters. As is evident, any desired combination of timeline, device, block, parameter and/or other controls may be used to illustrate any desired past: and or present information to a user including, for example, information related to on-line devices at the present time, i.e., on-line data, and information related to on-line devices in the past or future, and to off-line devices in the past, present or future, i.e., off-line data. Furthermore, as indicated with respect to FIG. 23, the same data, for example, the same parameter values for a device, may be illustrated for different times using timeline controls and, if desired, routines may be implemented to indicate the differences between the sets of values.

The timeline control changes the Time property of the Root object to a specific time (designated hereinafter as the ViewTime), which the user specifies using the timeline control. Consequently, the time attributes for all of the objects downstream of the Root object in the OLE hierarchy are changed to match the ViewTime as described above. In addition, the values of other properties of those objects are updated to the values corresponding to that ViewTime.

For a Block object in particular, the state of the corresponding block at any desired time (e.g., the ViewTime specified using the timeline control) is obtained using a transaction database. More particularly, the values of the parameters of the Block object at the ViewTime (i.e., the values of the Value properties of the Parameter objects of the Block object as of the ViewTime) are obtained by searching the transaction database in reverse-chronological order beginning at the ViewTime to find the values last assigned to the parameters corresponding to those Parameter objects on or before the ViewTime.

Figure 18:
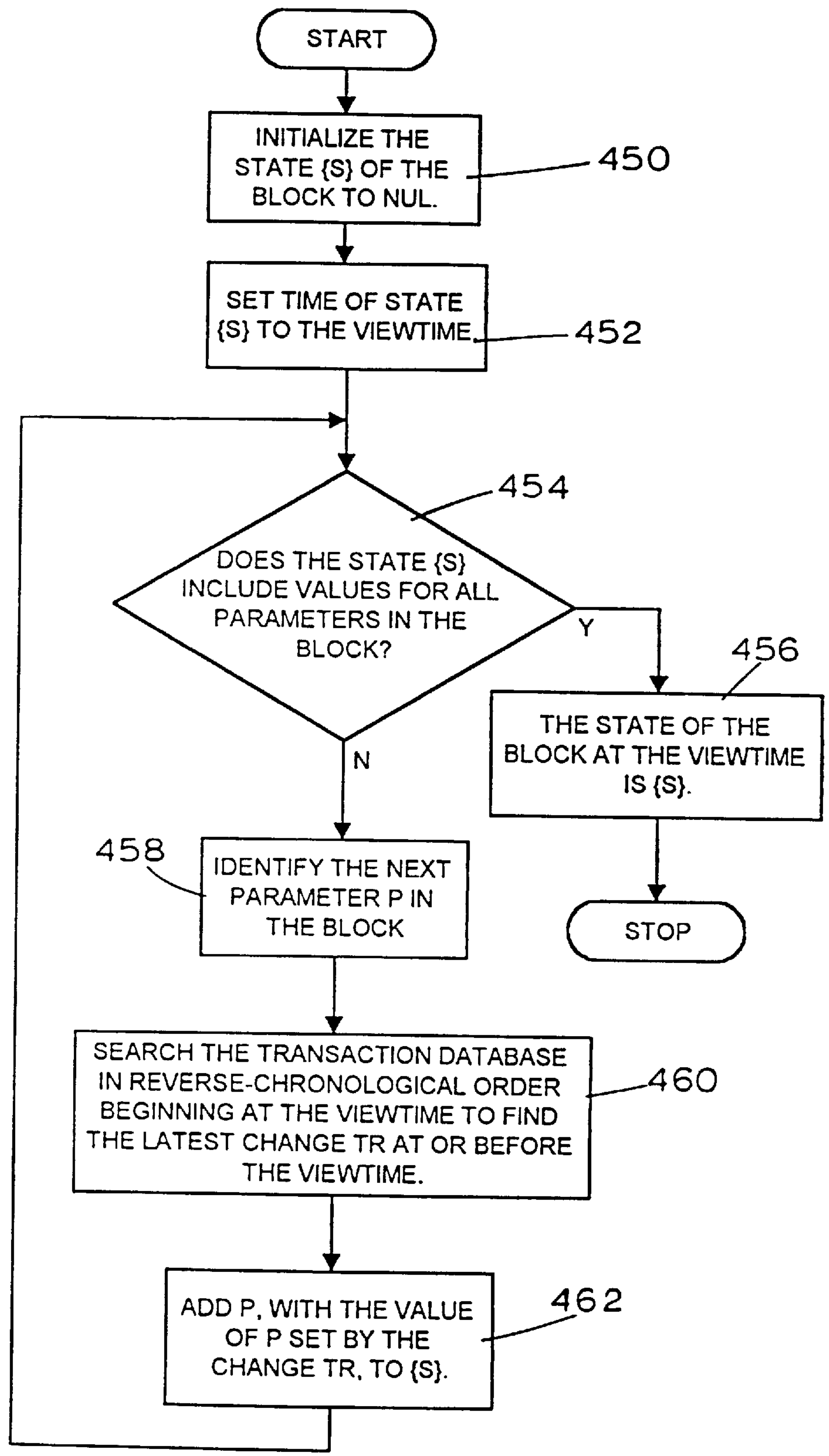
FIG. 18 is a flowchart illustrating programming for reconstructing an expected device state from a transaction database.

FIG. 18 is a flowchart illustrating how a state of a particular block can be reconstructed from the transaction database. First, a block 450 initializes a set variable {S} to null. The set variable {S} is used to accumulate the values as of the ViewTime of the parameters of the block whose ViewTime state is to be reconstructed. A block 452 then sets a time associated with the state {S} equal to the ViewTime. Thereafter, a block 454 determines whether the set variable {S} includes a value for each parameter of the Block Object. If it does, then a block 456 assigns the assembled state {S} as the state of the block at the ViewTime, and execution of the state reconstruction routine of FIG. 18 ends.

If the block 454 determines that the accumulated-state (i.e., the contents of the set variable {S}), does not include values for every parameter in the block, then a block 458 identifies the next parameter P for which a current value is not included in the accumulated state {S}. A block 460 then searches the transaction database in reverse-chronological order beginning at the ViewTime to find the latest-made change TR made at or before the ViewTime. A block 462 then adds the parameter P, with the value of the parameter P set by the change represented by transaction TR, to the accumulated state {S}, and control then returns to the block 454 to check, once again, whether values of all parameters in the block have now been accumulated in the state {S}.

Although the device, block, parameter, and timeline controls are illustrated and described herein, other controls according to the present invention could be constructed to illustrate other properties or data available through DDL, including data within any of the OLE objects illustrated in FIGS. 3 and 4A–4C.

While the present invention has been described with reference to specific examples, which are intended to be illustrative only, and not to be limiting of the invention, it will be apparent to those of ordinary skill in the art that changes, additions and/or deletions may be made to the disclosed embodiments without departing from the spirit and scope of the invention.

We claim:

1. An interface control adapted for use with a management system having a user interface, a database and a communication network that communicates with the database, a field device and a device description associated with the field device, wherein the field device, the device description and the database store a multiplicity of groups of logically related items of device data, the interface control comprising:

means for implementing a particular interface control for an indicated group of the multiplicity of groups of logically related items of device data including;

means for commanding the communication network to read the items of device data associated with the indicated group from at least one of the field device, the device description, and the database to produce a set of items of retrieved device data for the indicated group, and means for displaying the set of items of retrieved device data for the indicated group via the user interface in a predefined format;

means for identifying any one of the multiplicity of groups of logically related items of device data as the indicated group; and means responsive to the identifying means for invoking the implementing means to create the particular interface control for the indicated group.

2. The interface control of claim 1, wherein the implementing means further includes means responsive to the user interface for instructing the communication network to implement a change to one of the items of device data associated with the indicated group as the one of the items of device data is stored in the field device or the database.

3. The interface control of claim 2, wherein the instructing means includes means for determining if the change to the one of the items of device data associated with the indicated group is allowable and means for indicating, via the user interface, that the change is not allowable when the determining means determines that the change is not allowable.

4. The interface control of claim 3, wherein the determining means includes further means for commanding the communication network to retrieve a range indication associated with the one of the items of device data associated with the indicated group from one of the device description, the field device and the database and. means for checking to determine if the change to the one of the items of device data associated with the indicated group falls within the range defined by the retrieved range indication.

5. The interface control of claim 2, wherein instructing means includes means for determining if the change to the one of the items of device data associated with the indicated group is completed and means for indicating, via the user interface, that the change to the one of the items of device data associated with the indicated group has been completed.

6. The interface control of claim 5, wherein instructing means includes further means for indicating, via the user interface, that the change to the one of the items of device data associated with the indicated group is in the process of being completed.

7. The interface control of claim 1, wherein the implementing means further includes means coupled to the communication network for recognizing a change in one of the items of device data associated with the indicated group as stored in the field device or the database and means responsive to the recognizing means for indicating the change of the one of the items of device data associated with the indicated group via the user interface.

8. The interface control of claim 1, wherein the set of items of retrieved device data for the indicated group comprises data pertaining to the field device, and wherein a first of the set of items of retrieved device data includes a pictorial representation of the field device.

9. The interface control of claim 8, wherein a second of the set of items of retrieved device data includes an indication of the type of the field device.

10. The interface control of claim 9, wherein a third of the set of items of retrieved device data includes an indication of the location of the field device with respect to a system in which the field device is used.

11. The interface control of claim 10, wherein a fourth of the set of items of retrieved device data includes a list of information pertaining to the field device.

12. The interface control of claim 11, wherein the list includes at least one of methods for implementation on the field device and parameters associated with the field device.

13. The interface control of claim 1, wherein the set of items of retrieved device data for the indicated group comprises data pertaining to a block of the field device comprising one of an input, an output, or a control function associated with the field device, and wherein a first of the set of items of retrieved device data includes a pictorial representation of the block.

14. The interface control of claim 13, wherein a second of the set of items of retrieved device data includes an indication of the type of the block.

15. The interface control of claim 14, wherein a third of the set of items of retrieved device data includes an indication of the manner in which the block is associated with a system in which the block is used.

16. The interface control of claim 15, wherein a fourth of the set of items of retrieved device data includes a list of information pertaining to the block.

17. The interface control of claim 16, wherein the list includes an indication of a set of parameters associated with the block.

18. The interface control of claim 1, wherein the set of items of retrieved device data for the indicated group comprises data pertaining to a parameter associated with the field device, and wherein a first of the set of items of retrieved device data includes a label of the parameter and a second of the set of items of retrieved device data includes a value of the parameter.

19. The interface control of claim 18, wherein a third of the set of items of retrieved device data includes a unit designation associated with the value of the parameter.

20. The interface control of claim 18, wherein the value of the parameter comprises one of an enumerated list of potential values.

21. The interface control of claim 1, wherein the set of items of retrieved device data for the indicated group comprises configuration data related to the configuration of the field device at a particular time, and wherein the implementing means includes means for changing the particular time associated with the set of items of retrieved device data.

22. The interface control of claim 21, wherein the changing means includes further means for displaying a representation of a slider via the user interface and means for allowing manipulation of the slider to change the particular time.

23. The interface control of claim 21, wherein the changing means includes further means for changing the particular time between one of a plurality of times in the past, a present time, and a future time.

24. The interface control of claim 1, wherein the set of items of retrieved device data for the indicated group comprises configuration data related to two configurations of the field device at two particular times, and wherein the displaying means includes means for changing the particular time associated with the items of retrieved device data for the indicated group related to one of the two configurations.

25. A control adapted for use by a management system that includes a user interface and that is capable of being coupled to a plurality of field devices, each having a device description associated therewith, the control comprising:

- means for communicating with the plurality of field devices and the device descriptions to effect communication with respect to a multiplicity of groups of logically related items of device data stored in the plurality of field devices and the device descriptions;
- means for implementing a particular control for a particular one of the multiplicity of groups of logically related items of device data including,
  - means for controlling the communicating means to retrieve the items of device data within the particular one of the multiplicity of groups of logically related items of device data to produce a retrieved group of items of device data, and
  - means for displaying the retrieved group of items of device data via the user interface in a predefined format;
- means for identifying any of the multiplicity of groups of logically related items of device data as the particular one of the multiplicity of groups of logically related items of device data; and
- means responsive to the identifying means for invoking the implementing means to create the particular control for the particular one of the multiplicity of groups of logically related items of device data.

26. The control of claim 25, wherein the implementing means further includes means responsive to the user interface for instructing the communicating means to change one of the items of device data within the particular one of the multiplicity of groups of logically related items of device data.

27. The control of claim 26, wherein the instructing means includes means for determining if the change to the one of the items of device data is allowable and means for indicating, via the user interface, that the change is not allowable when the determining means determines that the change is not allowable.

28. The control of claim 26, wherein the instructing means includes means for determining if the change to the one of the items of device data is completed and means for indicating, via the user interface, that the change to the one of the items of device data has been completed.

29. The control of claim 26, wherein the communicating means includes means for recognizing when a further one of the items of device data changes to a changed item of device data and wherein the implementing means further includes means responsive to the recognizing means for automatically illustrating, via the user interface, the change to the further one of the items of device data when the further one of the items of device data is within the particular one of the multiplicity of groups of logically related items of device data.

30. The control of claim 29, wherein the illustrating means includes means for replacing one of the items of the retrieved group of items of device data with the changed item of device data via the user interface.

31. The control of claim 25, wherein the management system also includes a database that stores items of device data, wherein the communicating means includes further means for communicating with the database and wherein the implementing means includes further means for controlling the communicating means to retrieve, as part of the retrieved group of items of device data, the items of device data which are associated with the particular one of the multiplicity of groups of logically related items of device data and which are stored in the database.

32. The control of claim 31, wherein the displaying means includes means for making the displayed retrieved group of items of device data invisible to a user via the user interface.

33. The control of claim 31, wherein the communicating means includes means for categorizing the items of device data into a predetermined hierarchy of categories of device data, each having communication instructions, and wherein the communicating means communicates with one of the plurality of devices, one of the device descriptions or the database using the communication instructions associated with one of the categories of the hierarchy of categories of device data.

34. The control of claim 33, wherein the categorizing means includes objects in an object-oriented programming paradigm.

35. The control of claim 31, wherein the retrieved group of items of device data comprises data pertaining to one of the plurality of field devices, and wherein a first item of the retrieved group of items of device data includes a pictorial representation of the one of the plurality of field devices.

36. The control of claim 35, wherein a second item of the retrieved group of items of device data includes an indication of the type of the one of the plurality of field devices.

37. The control of claim 31, wherein the retrieved group of items of device data comprises data pertaining to a block comprising one of an input, an output, or a control function associated with one of the plurality of field devices, and wherein a first item of the retrieved group of items of device data includes a pictorial representation of the block.

38. The control of claim 31, wherein the retrieved group of items of device data comprises data pertaining to a parameter associated with one of the plurality of field devices, and wherein a first item of the retrieved group of items of device data includes a label of the parameter and a second item of the retrieved group of items of device data includes a value of the parameter.

39. The control of claim 38, wherein a third item of the retrieved group of items of device data includes a unit designation associated with the value of the parameter.

40. The control of claim 31, wherein the retrieved group of items of device data comprises configuration data related to the configuration of one of the plurality of field devices at a particular time, and wherein. the implementing means includes means for allowing a user to change the particular time associated with the configuration data.

41. The control of claim 40, wherein the allowing means includes means for changing the particular time between one of a number of past times, a present time, and a future time.

42. The control of claim 31, wherein the retrieved group of items of device data comprises configuration data related to first and second configurations associated with one or two of the plurality of field devices at two individual times, and wherein the implementing means includes means for allowing a user to change the individual time associated with the configuration data related to the first configuration.

43. The control of claim 42, wherein the implementing means includes second means for allowing a user to change the individual time associated with the configuration data related to the second configuration.

44. A method of controlling communication between a management system, having a user interface, and a plurality of field devices, each having a device description associated therewith, the method comprising the steps of:

providing a generalized interfacing routine which, for any particular one of a plurality of different groups of logically related items of the device data performs the steps of;

retrieving the items of device data associated with the particular one of the groups of logically related items of device data as stored in the plurality of field devices and the device descriptions, displaying the retrieved items of device data associated with the particular one of the groups via the user interface in a predefined format, recognizing when one of the items of device data stored in one of the plurality of field devices changes, and indicating, via the user interface, the change to the one of the items of device data when the one of the items of device data corresponds to one of the retrieved items of device data associated with the particular one of the groups; and using the generalized interfacing routine to perform communication for a multiplicity of the plurality of different groups of logically related items of device data.

45. The method of claim 44, including the steps of storing a subset of items of one of the groups of logically related items of device data in a database associated with the management system, communicating with the database to retrieve one of the subset of items of device data stored in the database as one item of the retrieved items of device data, recognizing when the one of the subset of items of device data stored in the database changes and indicating, via the user interface, the change to the one of the subset of items of device data stored in the database.

46. The method of claim 45, further including the step of changing a particular one of the items of device data stored in the field device or the database corresponding to a particular one of the retrieved group of items of device data in response to user input.

* * * * *